United States Patent
Gordin et al.

(10) Patent No.: US 9,144,141 B1
(45) Date of Patent: Sep. 22, 2015

(54) APPARATUS, METHOD, AND SYSTEM FOR MONITORING AND MAINTAINING LIGHT LEVELS AT TARGET AREA FOR LIGHTING SYSTEM

(71) Applicant: Musco Corporation, Oskaloosa, IA (US)

(72) Inventors: Myron K. Gordin, Oskaloosa, IA (US); Timothy J. Boyle, Oskaloosa, IA (US); Philip D. Hol, New Sharon, IA (US); Jeffrey A. Jacobson, Schaumburg, IL (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 14/508,210

(22) Filed: Oct. 7, 2014

Related U.S. Application Data

(63) Continuation of application No. 14/030,737, filed on Sep. 18, 2013, now Pat. No. 8,878,437, which is a continuation of application No. 11/963,084, filed on Dec. 21, 2007, now Pat. No. 8,575,861.

(60) Provisional application No. 60/871,627, filed on Dec. 22, 2006.

(51) Int. Cl.
  *H05B 33/08* (2006.01)
  *H05B 37/02* (2006.01)

(52) U.S. Cl.
  CPC .................. *H05B 37/0218* (2013.01)

(58) Field of Classification Search
  CPC ....................................................... H05B 37/02
  USPC ....................... 315/291, 307, 308, 312, 185 R
  See application file for complete search history.

(56) References Cited

U.S. PATENT DOCUMENTS

| | | | |
|---|---|---|---|
| 3,483,428 A | | 12/1969 | La Plante |
| 4,009,387 A | * | 2/1977 | Nuver .......................... 250/205 |
| 4,135,116 A | | 1/1979 | Smith |
| 4,190,795 A | | 2/1980 | Schultheis |
| 5,272,418 A | | 12/1993 | Howe et al. |

(Continued)

OTHER PUBLICATIONS

Time Clock WTC-4328 Programming Manual & Circuits, Douglas Lighting Controls, 20 pages. Dec. 22, 2006.

(Continued)

*Primary Examiner* — Minh D A
(74) *Attorney, Agent, or Firm* — McKee, Vorhees & Sease, PLC

(57) ABSTRACT

A method of sensing magnitude of lumen depreciation not only of a lamp of a lighting fixture, but other factors, by sensing a relative light level external of the lighting fixture to derive not only lamp lumen depreciation but total lumen depreciation from the fixture. An apparatus of monitoring light level of one or more lighting fixtures comprises a sensor positioned external of the lighting fixture(s), a comparator adapted to compare a measured actual lumen output signal from the sensor to a pre-set reference or threshold lumen output value. An error signal is generated by the comparator if the comparison indicates actual lumen output to have dropped below the reference or threshold lumen output. An alarm or communication can be actuated by the error signal to instruct corrective action to ensure relatively constant light levels to be maintained for the lighting system over time, thus providing ongoing assurance to the end user of proper system operation.

20 Claims, 20 Drawing Sheets

(56) References Cited

U.S. PATENT DOCUMENTS

| | | | |
|---|---|---|---|
| 5,272,419 | A | 12/1993 | Park |
| 5,495,385 | A | 2/1996 | Hsiu |
| 5,560,700 | A | 10/1996 | Levens |
| 5,699,243 | A | 12/1997 | Eckel et al. |
| 5,821,853 | A | 10/1998 | Gustavson et al. |
| 5,944,413 | A | 8/1999 | Crookham et al. |
| 5,977,717 | A | 11/1999 | Dean |
| 6,681,110 | B1 | 1/2004 | Crookham et al. |
| 6,815,911 | B2 | 11/2004 | Maruyama |
| 7,008,078 | B2 | 3/2006 | Shimizu et al. |
| 7,176,635 | B2 | 2/2007 | Gordin et al. |
| 7,176,640 | B2 | 2/2007 | Tagawa |
| 7,734,356 | B2 | 6/2010 | Cleland et al. |
| 7,797,117 | B1 | 9/2010 | Gordin |
| 8,159,156 | B2 * | 4/2012 | Henig et al. .......... 315/363 |
| 8,575,861 | B1 | 11/2013 | Gordin et al. |
| 8,860,316 | B2 * | 10/2014 | Barrilleaux .......... 315/152 |
| 8,860,324 | B2 * | 10/2014 | Barrilleaux et al. .......... 315/291 |
| 2002/0047624 | A1 | 4/2002 | Stam et al. |
| 2004/0100749 | A1 | 5/2004 | Lentz et al. |
| 2004/0188593 | A1 | 9/2004 | Mullins et al. |
| 2004/0240208 | A1 | 12/2004 | Beasley |
| 2005/0184681 | A1 | 8/2005 | Gordin et al. |
| 2005/0259416 | A1 | 11/2005 | Gauna et al. |
| 2005/0285547 | A1 | 12/2005 | Piepgras et al. |
| 2006/0006821 | A1 | 1/2006 | Singer et al. |
| 2006/0028155 | A1 | 2/2006 | Young |
| 2006/0118697 | A1 | 6/2006 | Lee et al. |
| 2006/0139659 | A1 | 6/2006 | Steinberg |
| 2011/0202151 | A1 * | 8/2011 | Covaro et al. .......... 700/90 |

OTHER PUBLICATIONS

"Control Link—Flexible control and solid management of your facility, saves operating costs and improves service", Musco Corporation, Oskaloosa, Iowa, 9 pages. Dec. 31, 2005.

"Lamp Technical Info", Venture Lighting, www.venturelighting.com, 1 page. Dec. 21, 2006.

"PL3120 and PL3150 Power Line Smart Transceivers Models 15310-1000, 15320-960, 15311R-1000, and 15321 R-960" Echelon, wwww.echelon.com, 13 pages. Dec. 31, 2003.

"TSL237 High-Sensitivity Light-to-frequency Converter" TAOS, Texas Advanced Optoelectronic Solutions, TAOS052D, 10 pages. Jan. 31, 2006.

* cited by examiner

APPARATUS, METHOD, AND SYSTEM FOR MONITORING AND MAINTAINING LIGHT LEVELS AT TARGET AREA FOR LIGHTING SYSTEM

CROSS-REFERENCE TO RELATED APPLICATIONS

This is a Continuation Application of U.S. Ser. No. 14/030,737 filed Sep. 18, 2013, now U.S. Pat. No. 8,878,437 issued on Nov. 4, 2014, which is a Continuation Application of U.S. Ser. No. 11/963,084 filed Dec. 21, 2007, now U.S. Pat. No. 8,575,861 issued on Nov. 5, 2013, which claims priority under 35 U.S.C. §119 of a provisional U.S. application Ser. No. 60/871,627 filed Dec. 22, 2006, all of which applications are hereby incorporated by reference in their entirety.

I. BACKGROUND OF INVENTION

A. Field of Invention

The present invention relates to lighting fixtures, and in particular, to monitoring the performance of and allowing for compensation for lumen depreciation or other losses of light during operation of lighting fixtures. In one example of performance, if monitored actual lumen output drops below a preset threshold level, appropriate action can be taken, such as servicing or automatic compensation.

B. Problems in the Art

Almost any light source has a life span. One problem with certain types of light sources is that during their normal operating life span, the amount of light they produce diminishes; they lose lumen output (or flux) over operating time.

One example is HID lamps, the type frequently used in wide area lighting systems such as sports lighting. A Model MH 1500 W/HBU metal halide 1500 watt lamp commercially available from Venture Lighting International, Solon, Ohio USA is an example. These lamps, as well as relatively all HID lamps used in the industry, exhibit the well-known lamp lumen depreciation (LLD) function (see, for example, Venture Lamp Catalog, 2004 edition, Venture Lighting International, page 93 *Lamp Technical Info*, which is incorporated by reference herein and which includes a lumen depreciation or lumen maintenance curve, as published by that lamp manufacturer). LLD, in these types of lamps, results in a relatively substantial decrease in lumen output after a first operating period (usually the first 50 to 200 hours of operation), then a less substantial rate in the next 1000 hours or so. Thereafter, lumen decrease continues, but at a substantially slower rate. A typical lumen maintenance curve for a variety of groups of field and laboratory tested 1500 watt metal halide HID lamps is shown in FIG. 8. This testing was conducted by technical personnel of Musco Lighting (Musco) of Oskaloosa, Iowa, USA. It illustrates the relatively consistent decrease in lumen or light output or quantity over cumulative operating hours, including a relatively quicker rate of drop early and slower rate of drop later. But it also shows there is variability between groups. There can also be variability between individual lamps, including between lamps of the same manufacturer model and specifications.

Lamp manufacturers usually attempt to provide customers with information that characterizes LLD for the particular lamp. Many times the manufacturer gives a rather specific indication of expected magnitude of the rather dramatic lumen drop that occurs during the first operating period. They typically consider the lamp lumen output "stabilized" after this initial substantial lumen decrease; many times stated as or called "100-hour burn-in". Some manufacturers also give what is called a lumen depreciation factor (LDF) (sometimes referred to as lamp maintenance factor) or other specification that generally characterizes LLD over the entire predicted normal operating life of the lamp. For example, a typical LDF is 0.75. A more generous factor is 0.82. Both indicate in a very general way that the lamp will tend to decrease in lumen output over the lamp's life, down to 75 percent of its original output (for LDF of 0.75) or 82 percent for LDF of 0.82 (see, e.g., FIG. 8). LDF is a dimensionless value between 0 and 1.0 which is related to the proportion of light output of a lamp produced after a set time of operation to that provided when new. There are generally two ways to obtain LDF. One is from the lamp manufacturer's LLD curve or chart. The other is by dividing maintained lumens of the lamp by initial lumens. However, maintained lumens are generally rated at 40 percent of the lamp's life, so at best it provides a relative indication of the predicted lumen depreciation. The amount of depreciation in the remaining 60% of the lamp's life would need to be estimated.

Another definition of LDF is the fractional remainder of lamp lumens, at rated operating conditions, due to lamp degradation. The greater, i.e. closer to 1.0, the LDF means a lamp will remain brighter longer.

Lamp life is defined by lamp manufacturers as the length of time in hours when 50 percent of the lamps in a group are expected to fail. In sports lighting, for example, lamps are usually elevated on poles or superstructure. To replace a lamp usually requires a lift or crane. Thus, to prevent the cost, resources, and inconvenience of spot replacement of individual lamps ad hoc as they fail, and to promote energy efficiency, the IESNA (Illuminating Engineering Society of North America) promotes group lamp replacement at 70% of rated lamp life. For a typical 3000 hour rated lamp, this would be at 2100 hours of cumulative operating time. A worker need only be lifted one time to service all lamps on each pole.

However, lamp performance has improved in recent years, which has resulted in considerably fewer lamp failures up to the rated life of the lamp. Consequently, most customers choose not to replace the lamps at 70% of life, but instead continue to operate them until the quantity of lamp failures causes significant loss in light produced on the target area.

Thus, due to this extended life, prediction of LLD becomes more critical to avoid insufficient light on the target area prior to lamp replacement. But, at best, LDF is quite arbitrary because it is a rough generalization and each lamp differs in its operating characteristics over time.

While published LLD essentially allows the manufacturer to take the position that they have warned the customer of the expected initial light loss from its lamp until it is "stabilized", the customer is left to deal with it. And, if the manufacturer gives an LDF to the customer, it is an even more general estimation of expected light loss after the initial period, and the customer, again, is left to deal with it.

Giving published predicted LLD and/or LDF can attempt to absolve the lamp manufacturer of responsibility if lumen output of the lamp does not meet or exceed their predictions. Furthermore, because LLD is so difficult to predict after the lamp is stabilized, and because it is relatively gradual, lamp manufacturers tend to disclaim any liability after lamp stabilization. Some lamp manufacturers voluntarily replace a lamp if it fails or loses substantially more light than the manufacturer's predicted amount until it "stabilizes" (e.g. the first 100 hours or so of operation). The customer is truly left to deal with the lamp after stabilization, which is after the first 100 hours of operation.

Historically, one approach to deal with this lamp characteristic is for the lighting system designer (usually not the lamp manufacturer) to take initial lumen depreciation into account when designing the lighting system. Essentially, the predicted light output is used in the calculation to determine the quantity of fixtures needed to meet the desired light level. This approach compensates roughly for initial lumen depreciation, but over operating time, light output will continue to drop. Many times it drops to an unacceptable level. The customer must either live with this or replace the lamp relatively early in the lamp's life, often as soon as one-third of the useful life. A typical HID lamp life is at least thousands of hours, generally in the range of 3,000 or more for 1500 watt lamps. Thus, the lamp manufacturer generally will not monetarily compensate for or replace the lamp because it is well after the initial 100 hour period. Also, lumen depreciation to unacceptable levels at one-third of normal lamp life (e.g. at roughly 1000 hours of operation for a 3000 rated life lamp) either forces the customer of the lighting system to spend the cost of replacement or to suffer unacceptable light levels for a potentially lengthy time—e.g. more than one-half of anticipated normal life. Again, the problem falls on the customer's shoulders.

Most customers of sports lighting (e.g. public institutions such as school districts, park and recreation departments, municipalities, and the like, or their private sector analogs like private schools, sports clubs, and the like) are not lighting experts. Therefore, they tend to let LLD go instead of dealing with it. They may not even appreciate it. Lamps tend to keep operating at the end of useful or rated life even if they are no longer useful. They appear "on" but do not supply a useful amount of light. This can have potentially negative results. Inadequate lighting levels can make it both more difficult, and less enjoyable, to play a sport or to watch it. There can even be concerns of injury to sports players. Organizations such as IESNA and others have developed sports field illumination intensity and uniformity minimums for different sports for these purposes. Many customers try to insure against these types of problems by specifying that such standards be met by the entity installing the sports lighting system.

Problems with this approach can include the following. The lighting system installer typically must rely on the lamp manufacturer LLD or LDF specifications. However, as discussed above, they are not normally precise enough. Also, no two lamps are identical on these points. One lamp of identical nominal operating wattage and other structure can vary dramatically in initial lumen drop as well as lumen drop after lamp stabilization. Relying on lamp manufacturer specifications also assumes the lamp will perform as predicted despite other factors that can affect it. Therefore, using the lamp manufacturer's specifications is merely an educated guess for individual lamp performance.

Therefore presently many owners or operators of such lighting systems periodically, without reference to actual need, change out lamps, clean lenses and reflective surfaces, and perform other maintenance tasks on each fixture periodically to try to meet IESNA light level guidelines. But this is costly and cumbersome in terms of time and labor resources. It also is done regardless of actual need. The tasks may be done too late to avoid violation of the guidelines, or they may be done too early, in terms that the work is not needed. Therefore, there is room for improvement in this area.

One relatively recent approach to addressing LLD is the commercially available SMART LAMP® system from Musco Lighting, Oskaloosa, Iowa USA. Circuitry automatically adds operating power to each lamp at pre-set times over operating life of the lamp to compensate for LLD. The manufacturer's LLD and LDF information or information obtained from extensive testing is used to pre-set the times and amount of increased wattage to keep lamp light output more constant over operating life (e.g. +/−10% of a predetermined level, or even better). Details about SMART LAMP®-type systems can be found in U.S. Published Application 2005/0184681A1 issued as U.S. Pat. No. 7,176,635 on Feb. 13, 2007, which is incorporated by reference in its entirety herein. It allows an end-user customer to have a lighting system that ensures near constant light output over the normal operating life of such lamps. This avoids arbitrarily replacing lamps well prior to end of their normal life span or ignoring LLD and leaving lamps in place beyond their useful life (i.e. where the value and/or amount of the light produced does not warrant the energy consumed). It also allows a lighting system installer or designer to be able to take over responsibility for maintaining a relatively consistent light output for the lamps over their entire normal operating life. It allows such responsibility for the entire operating life of the lighting system.

A specific sports lighting example further illustrates the issues in the state of the art. Lamps of typical sports lighting type (mentioned above) have nominal operating lives of thousands of hours (e.g. 3000 hours). One present approach is to replace all lamps at 1200 or 2100 hours of operation because of lumen loss (assumes total LDF of 0.8 and 0.7 respectively). A SMART LAMP® system allows lamps to be run at least their nominal life span, and substantially more (e.g. three or more times longer in some cases). But further, typical sports lighting systems (poles, light fixtures, wiring and circuits) can last decades. The SMART LAMP® system can be installed one time. It can therefore be used to maintain light output of the lamps, and decrease replacement of lamps multiple times over those many years of normal operating life of such systems. It therefore allows a lighting system installer or designer to take responsibility for light output of the system for its entire normal life span. A sports lighting system typically is operated 3-6 hours/day. This translates into one to two thousand hours per year. Over twenty years, this can mean from approximately six to twelve (or more) sets of lamps based on 3000 hours normal life span.

However, the foregoing has several potential issues. The approach generally only compensates for predicted loss in light output from the lamp and some allowance for other factors. It does not address actual total light output loss from the lighting fixture or fixtures. There is also a need in the art for compensation of other types of light loss from lighting systems. Lumen depreciation can include not only LLD (lamp lumen depreciation) but lumen loss from dirt or debris (i.e. LDD or luminaire dirt depreciation that accumulates on the glass lens of the lighting fixtures or on optical surfaces), and other factors known in the art.

LDD is a common loss in enclosed fixtures. It can be caused by atmospheric dirt or other substance(s) accumulation on the outer lens surface. It can also be caused by dirt or other substance(s) or deposit(s) on interior fixture components (e.g. atmospheric dirt or dust which enters the fixture or a film from chemical out gassing). Out gassing is the result of vapor release as foreign objects and components of chemical composition are heated up. There can be other substances that absorb, obstruct, or otherwise disrupt light from leaving the fixture in a useful manner. IESNA refers to these types of lumen loss as lumen dirt depreciation or LDD. Manufactures often do provide an LDD factor, similar to the LLD, to account for such loss in output. A typical factor may be 0.93, which can be combined with the LLD to represent an approximation of total losses. For example, an LLD of 0.75 with an LDD of 0.93 will result in total loss factor of 0.7 by known in the art calculations. However, the amount of LDD losses may be significantly more than estimated if the fixture design does not prevent out gassing or if care is not used to prevent foreign bodies or materials in the internal fixture assembly during manufacture, assembly, installation, or operation.

There are other potential causes for light loss from a lighting fixture. Some are called "non-recoverable" because preventive maintenance does not generally effect the extent of such loses and the losses are not recovered by maintenance. Some examples are ballast factor, supply voltage variation, and lamp tilt factor. The present invention pertains primarily to what are sometimes called "recoverable" factors; specifically LLD, LDD, and lamp burnout.

Thus, there are many factors that contribute to loss in light output from the fixtures. Since these factors vary from fixture to fixture, it is difficult to accurately predict them. A need therefore exists to assure the customer that its lighting system will achieve a desired light level and hold that level relatively constant over time. A better solution is not indicated if based on just a lamp manufacturer's generalized, rough estimate of LLD and LDD.

II. SUMMARY OF THE INVENTION

It is therefore a principle object, feature, advantage, or aspect of the present invention to improve over the state of the art.

It is a further object, feature, advantage, or aspect of the present invention to solve problems and deficiencies in the state of the art.

Further objects, features, advantages, or aspects of the present invention include an apparatus, method, or system which:
a. compensates for more than just predicted light losses;
b. uses apparatus and methods to more comprehensively monitor sources of lumen depreciation from the fixture by monitoring light output externally of the fixture;
c. optionally allows automatic or manual compensation for all monitored lumen depreciation of the fixture;
d. is economical;
e. is durable, even in out-of-doors environments;
f. provides reasonable accuracy;
g. is practical;
h. does not rely completely on predictions of lumen deprecation; and
i. monitors actual lumen deprecation over time.

These and other objects, features, advantages, or aspects of the present invention will become more apparent with reference to the accompanying specification.

A method according to one aspect of the invention comprises monitoring light output external of a light fixture to sense magnitude of lumen depreciation not only of the lamp but other factors.

A method according to another aspect of the present invention comprises sensing a relative light level external of a light fixture to derive not only lamp lumen depreciation but total lumen depreciation or light loss from the fixture.

A method according to another aspect of the present invention comprises using a sensed level of light external of the fixture to automatically generate a signal if light level drops below a predetermined threshold. The threshold can be based upon a desired light level external of the lamp, for example, a desired light level at a target area or space for light from the fixture. One specific example would be a recommended minimum light intensity level for a sports field.

Another method according to an aspect of the present invention comprises using the signal to actuate an alarm or automated communication. This would allow, for example, a receiving party to take action to at least check the status or operation of the lighting system and take corrective action to ensure levels are achieved.

Another aspect of the present invention is an apparatus comprising a light level monitor operatively positioned to sense lumen output of one or more lighting fixtures externally of the one or more fixtures and generate an actual lumen output signal representative of the sensed lumen output. A comparator compares the actual lumen output signal to a pre-set reference or threshold lumen output signal. An error signal is generated by the comparator if the comparison indicates actual lumen output to have dropped below the reference or threshold lumen output. Optimally, the error signal can actuate an alarm or communicate to a device.

These and other objects, features, advantages, or aspects of the present invention will become more apparent with reference to the accompanying specification.

III. BRIEF DESCRIPTION OF THE DRAWINGS

From time-to-time in this description reference will be taken to the drawings which are identified by Figure number and are summarized below.

Figure 3A:
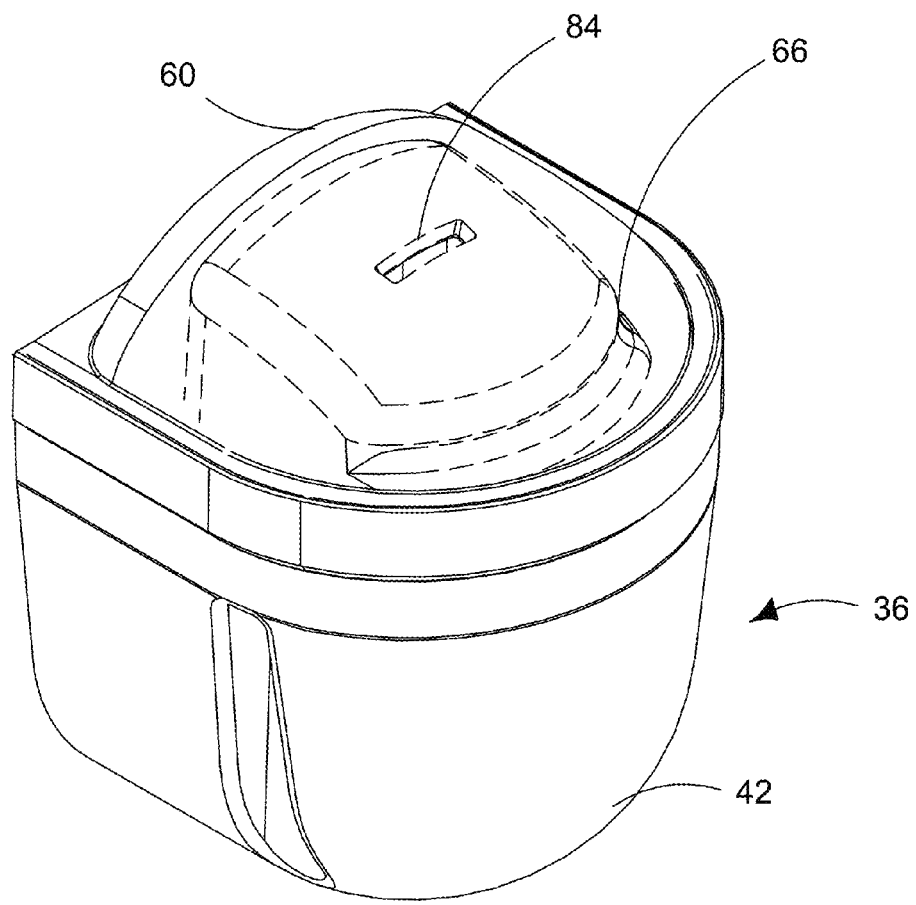
FIG. 3A is an enlarged, isolated assembled perspective view of the photo sensor assembly 36 of FIGS. 2A-C.
Figure 3B:
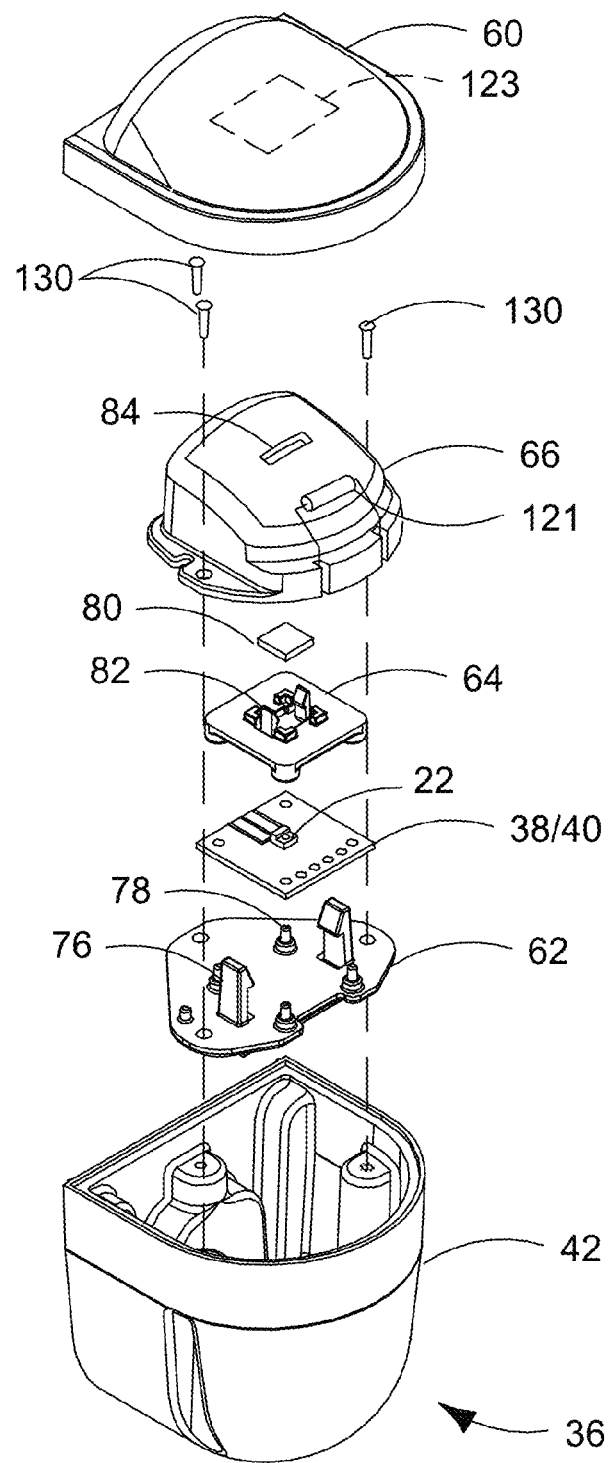
FIG. 3B is a smaller in scale exploded view of the photo sensor assembly 36 of FIG. 3A.
Figure 3C:
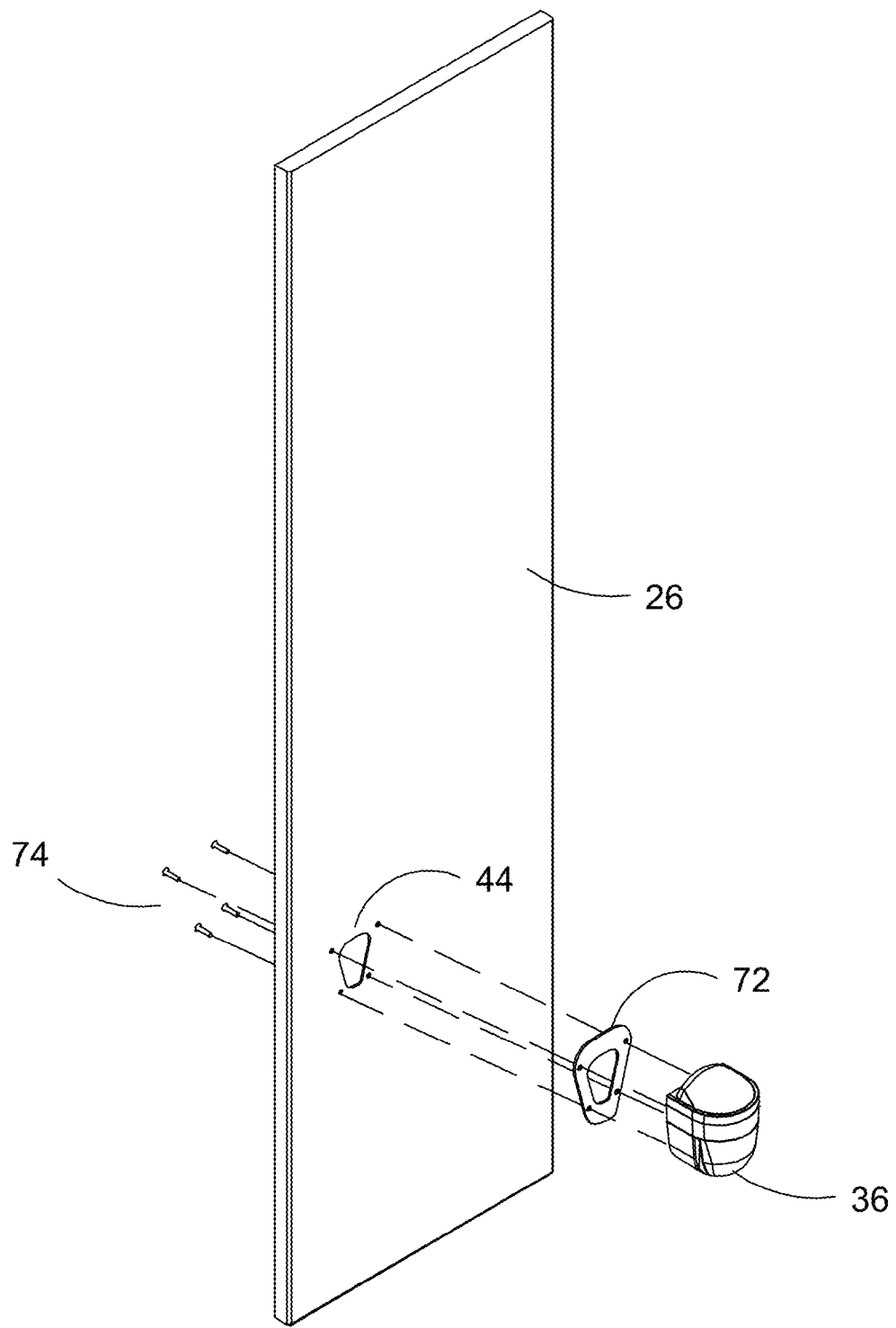
FIG. 3C is a still smaller in scale perspective view of assembled sensor assembly 36 of FIG. 3A but showing, in exploded form, its mounting method to a door of an enclosure box such as that of FIG. 2B.
Figure 3D:
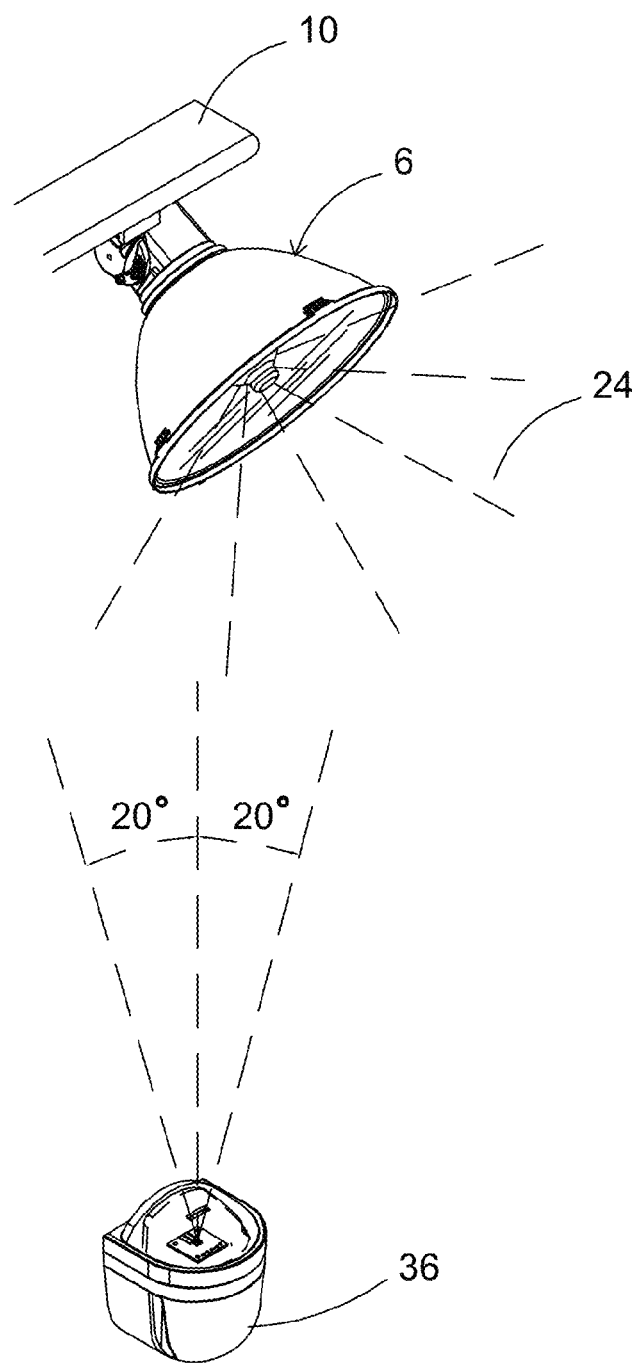

FIG. 3D diagrammatically illustrates operation of assembly 36 and its "field of view" in one direction.

Figure 3E:
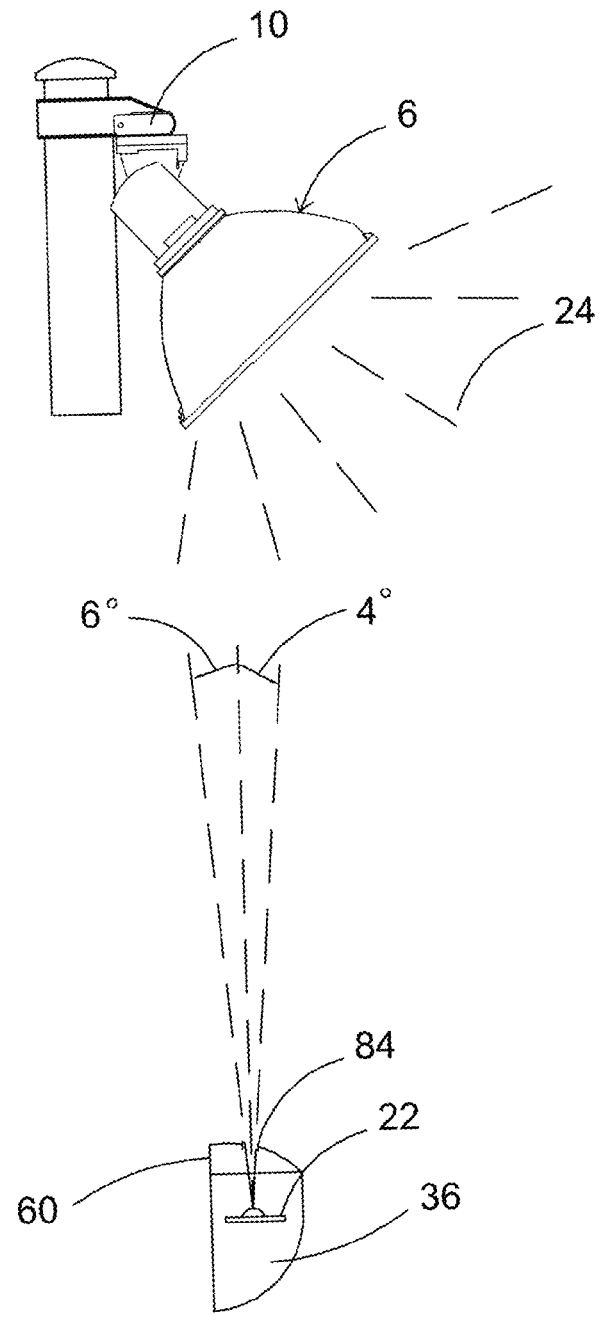

FIG. 3E is similar to FIG. 3D but shows the field of view of sensor assembly 36 from a direction perpendicular to that of FIG. 3D.

Figure 3F:
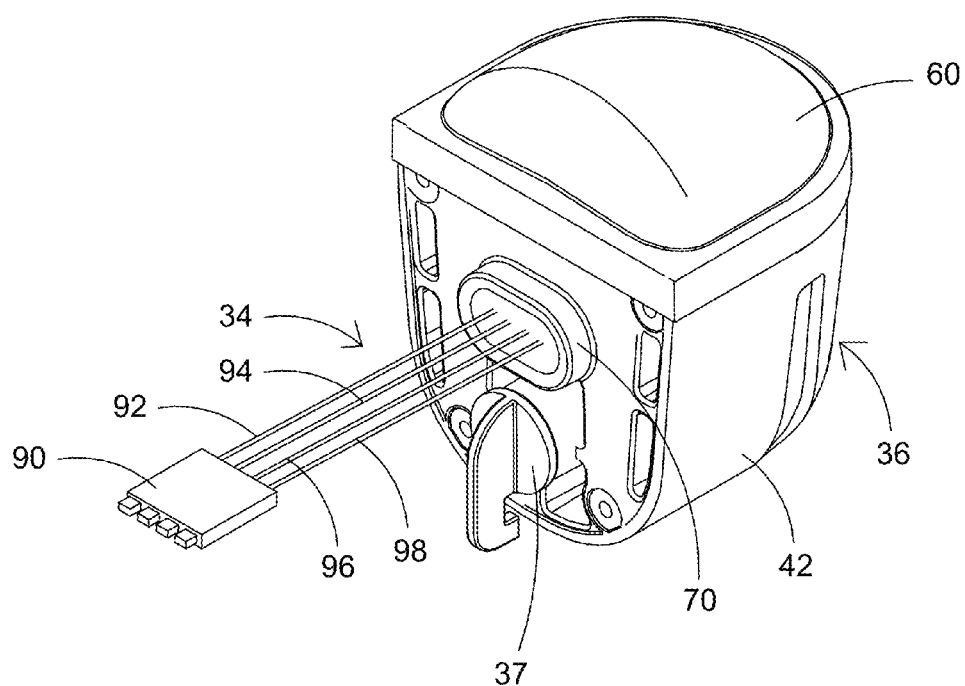

FIG. 3F is a rear perspective view of assembly 36 with an interface for the sensor processor board in assembly 36.

Figure 3G:
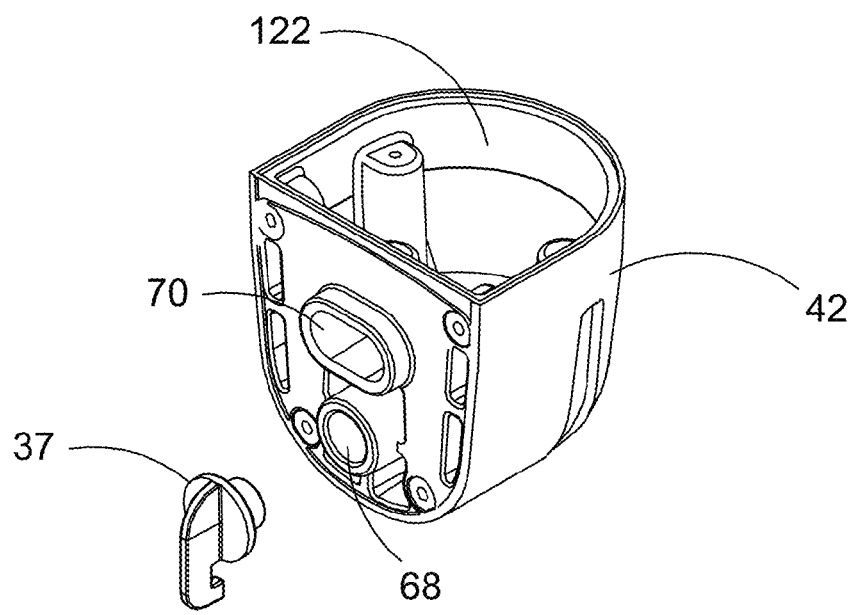

FIG. 3G is similar to FIG. 3F but illustrates the assembly housing (with top lid and interior contents removed, and a plug in the back wall exploded from the back wall).

Figure 4:
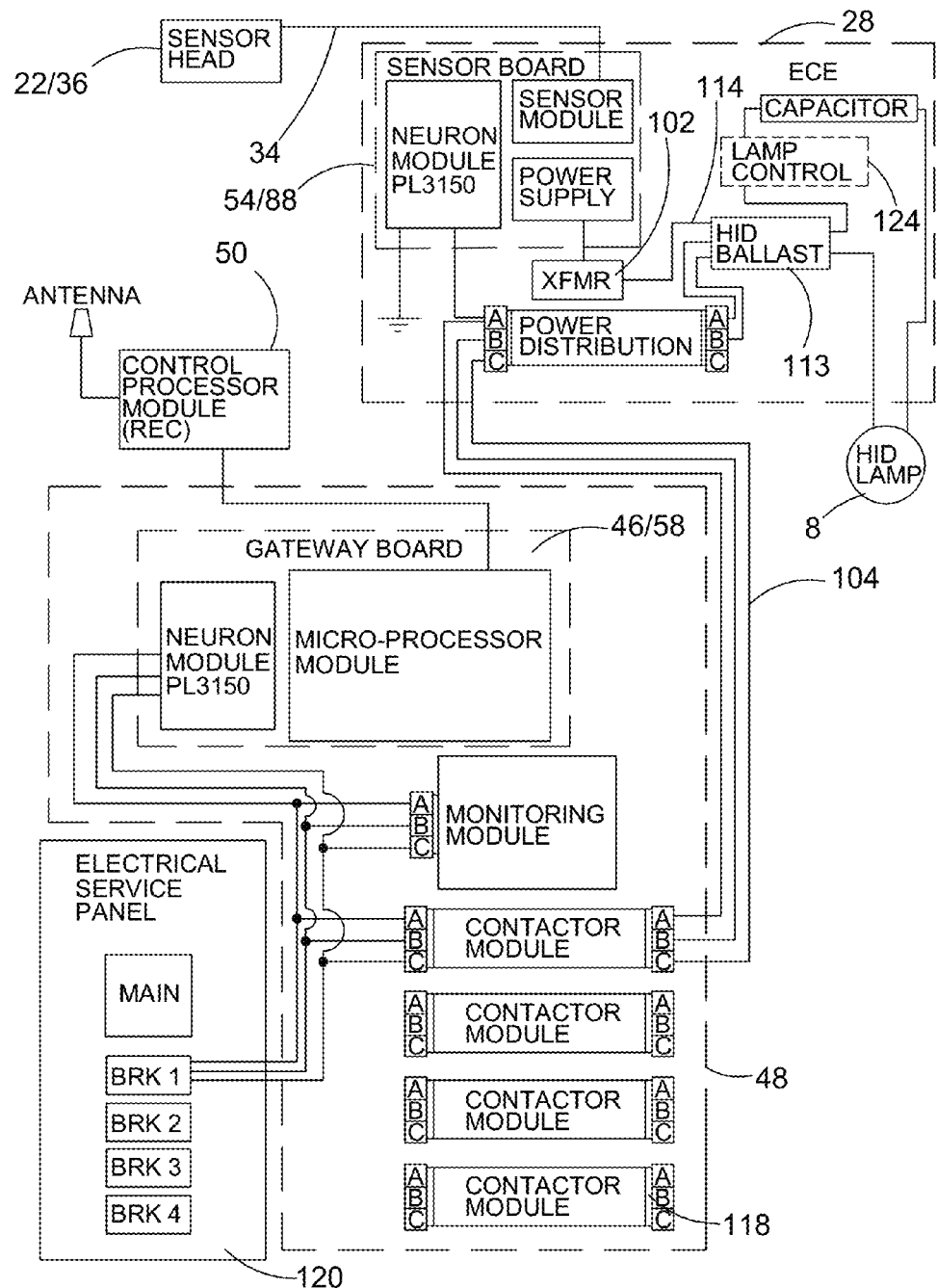

FIG. 4 is a block diagram of the photo sensor circuit, the sensor processor circuit and its interface with a gateway processor circuit according to another exemplary embodiment of the invention.

Figure 5A:
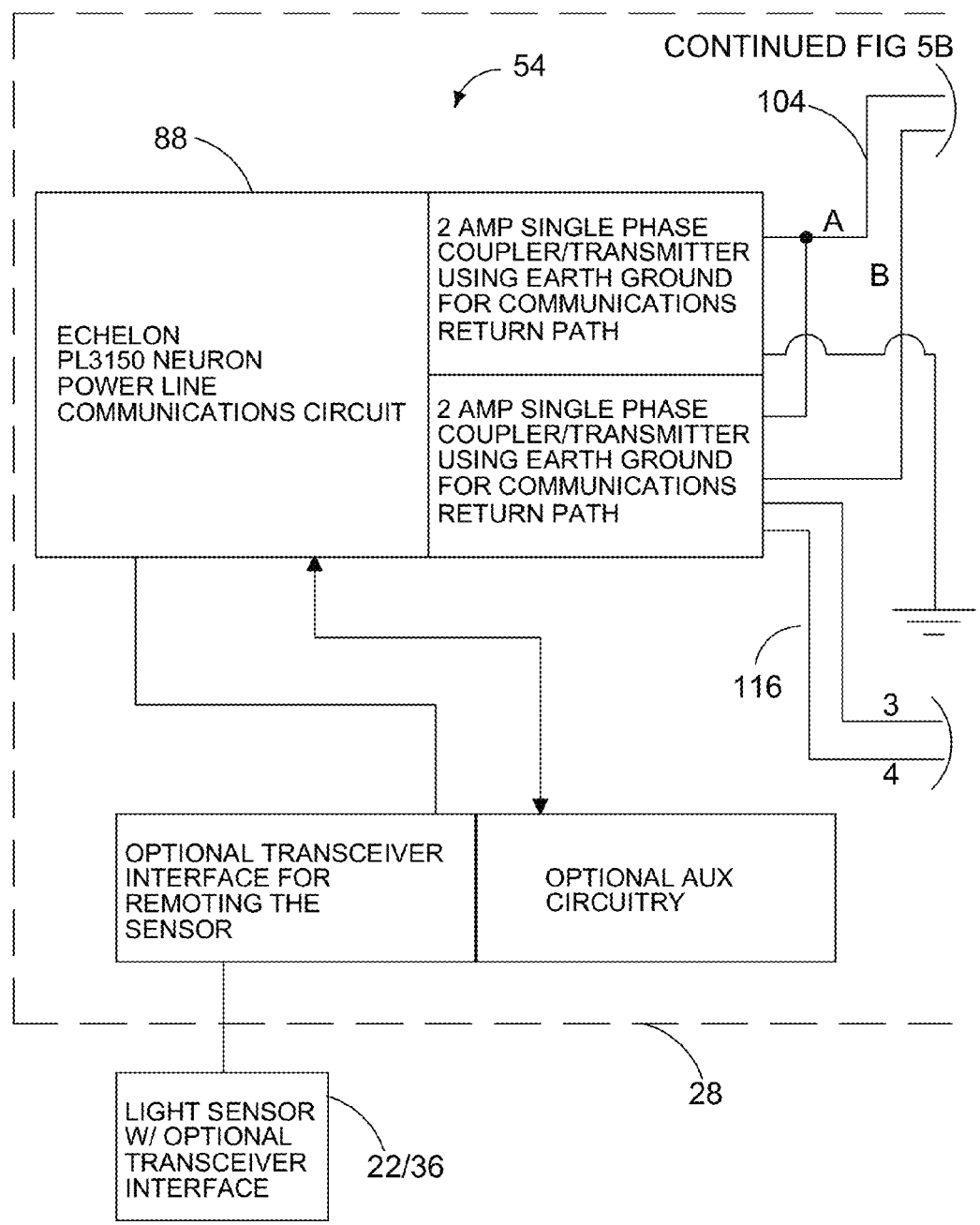

FIGS. 5A and B is an additional block diagram of the sensor processor circuit of FIG. 4.

Figure 6A:
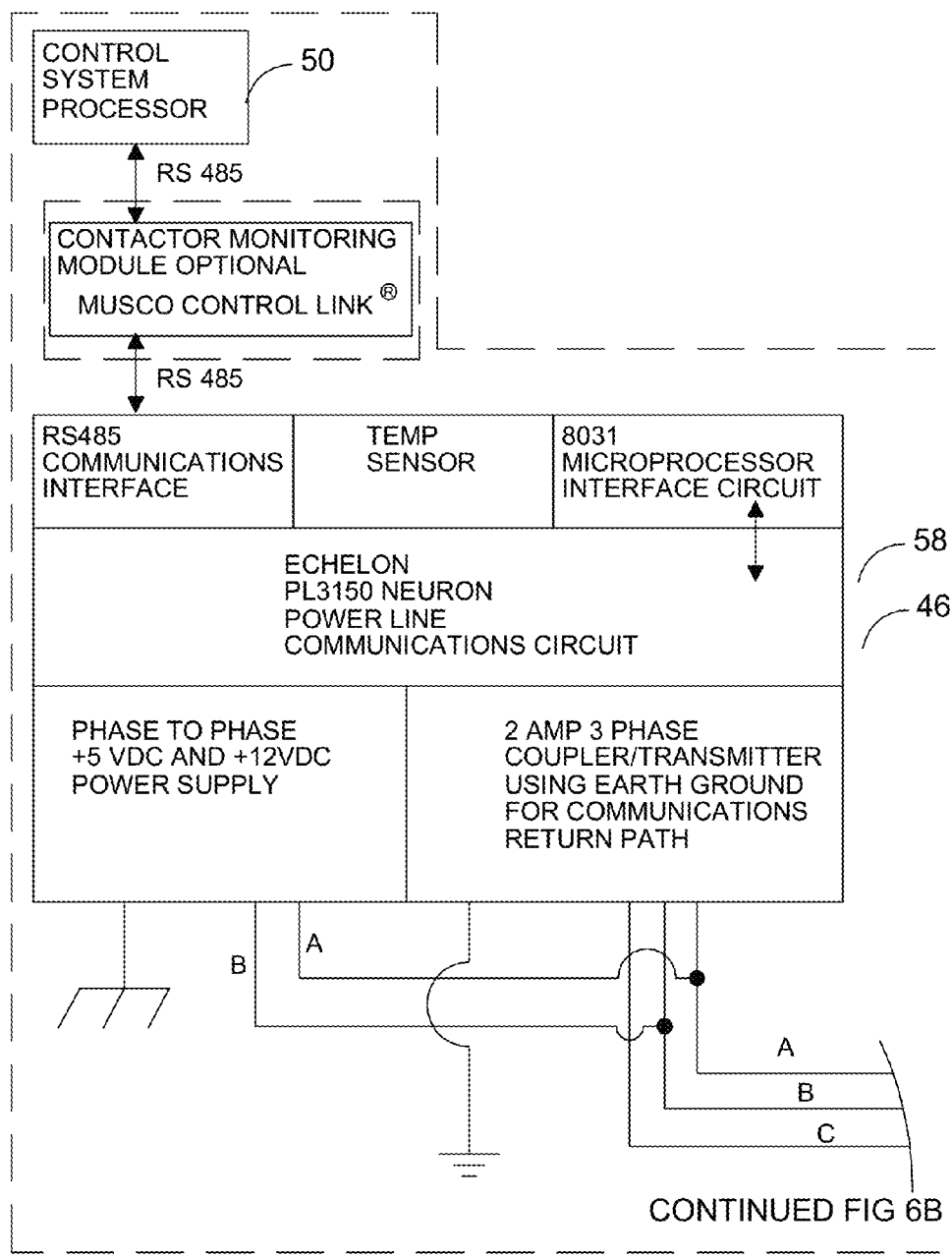

FIGS. 6A and B is a block diagram of the gateway processor circuit of FIG. 4.

Figure 7:
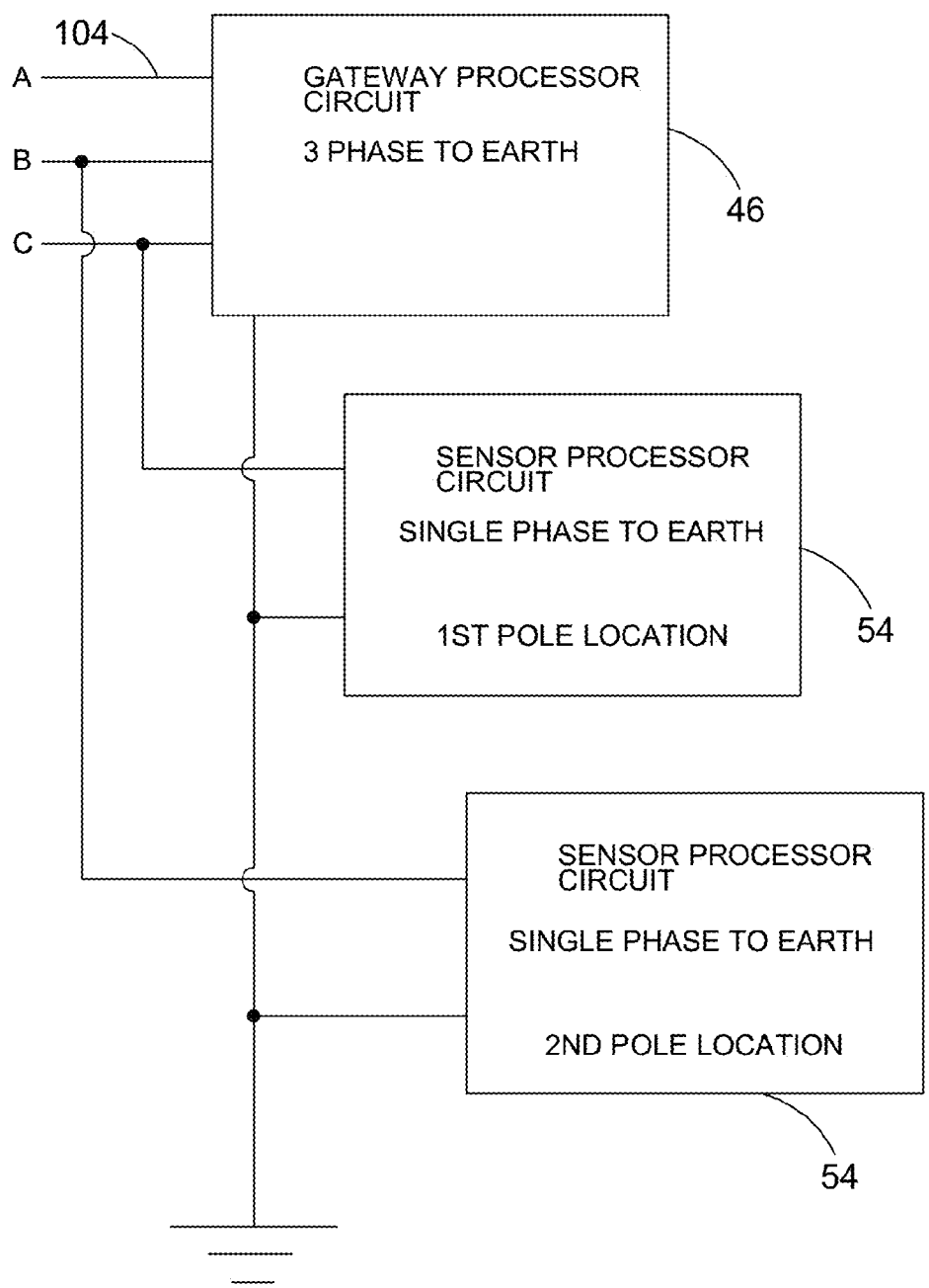

FIG. 7 is block diagram of a power line carrier connection method for the system of FIGS. 3A-G.

Figure 8:
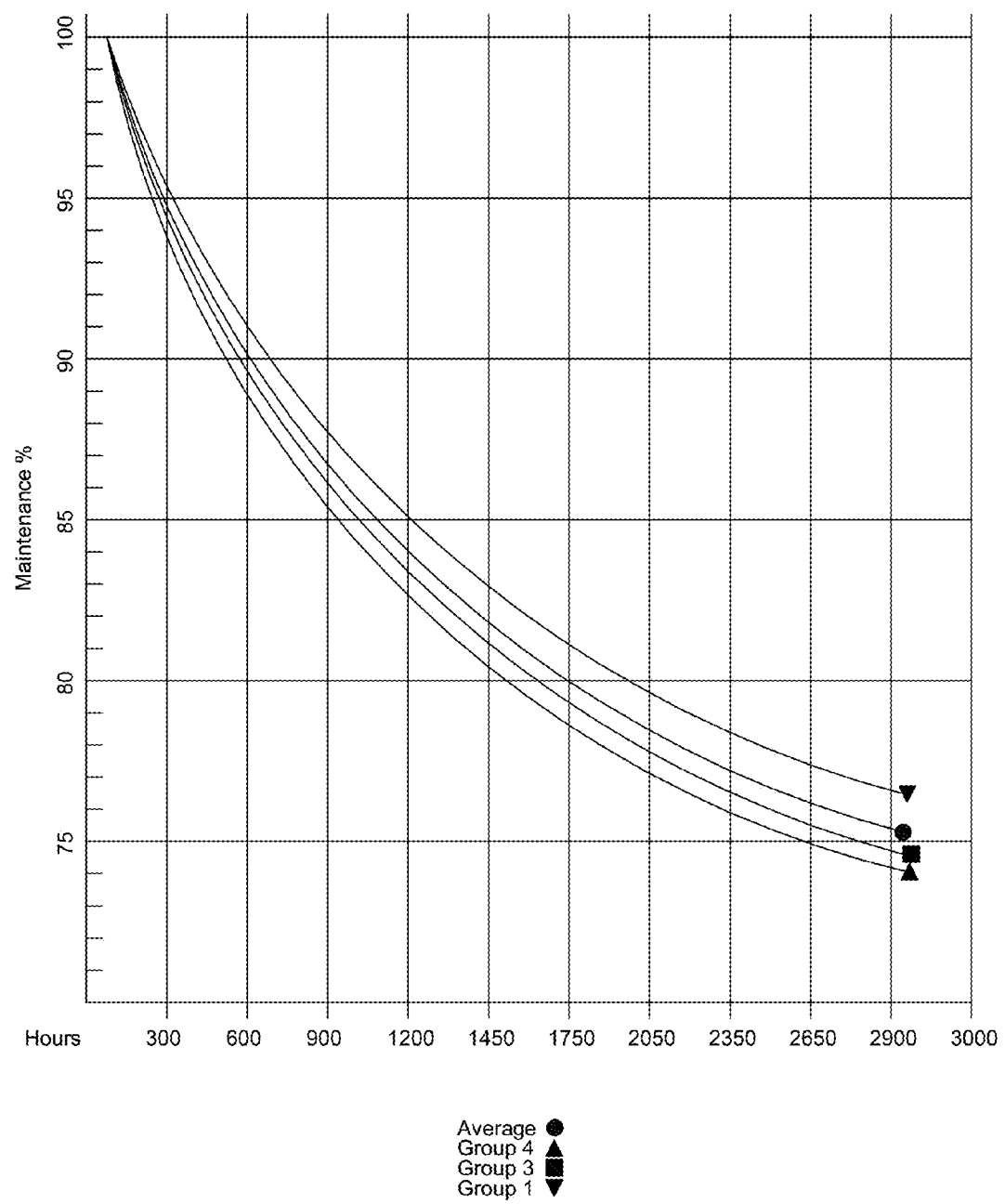

FIG. 8 is a chart showing exemplary lumen depreciation curves for several HID lamps.

IV. DETAILED DESCRIPTION OF EXEMPLARY EMBODIMENTS

A. Overview

To assist in a better understanding of the invention, one example of a form it could take will now be described in detail. It is to be understood that this is but one form the invention could take. A few alternatives and options will also be described. However, the invention could take many forms and embodiments. The scope of the invention is not limited by the few examples given herein. Also, variations and options obvious to those skilled in the art will be included in the scope of the invention.

B. Conventional Sports Lighting System

Figure 1A:
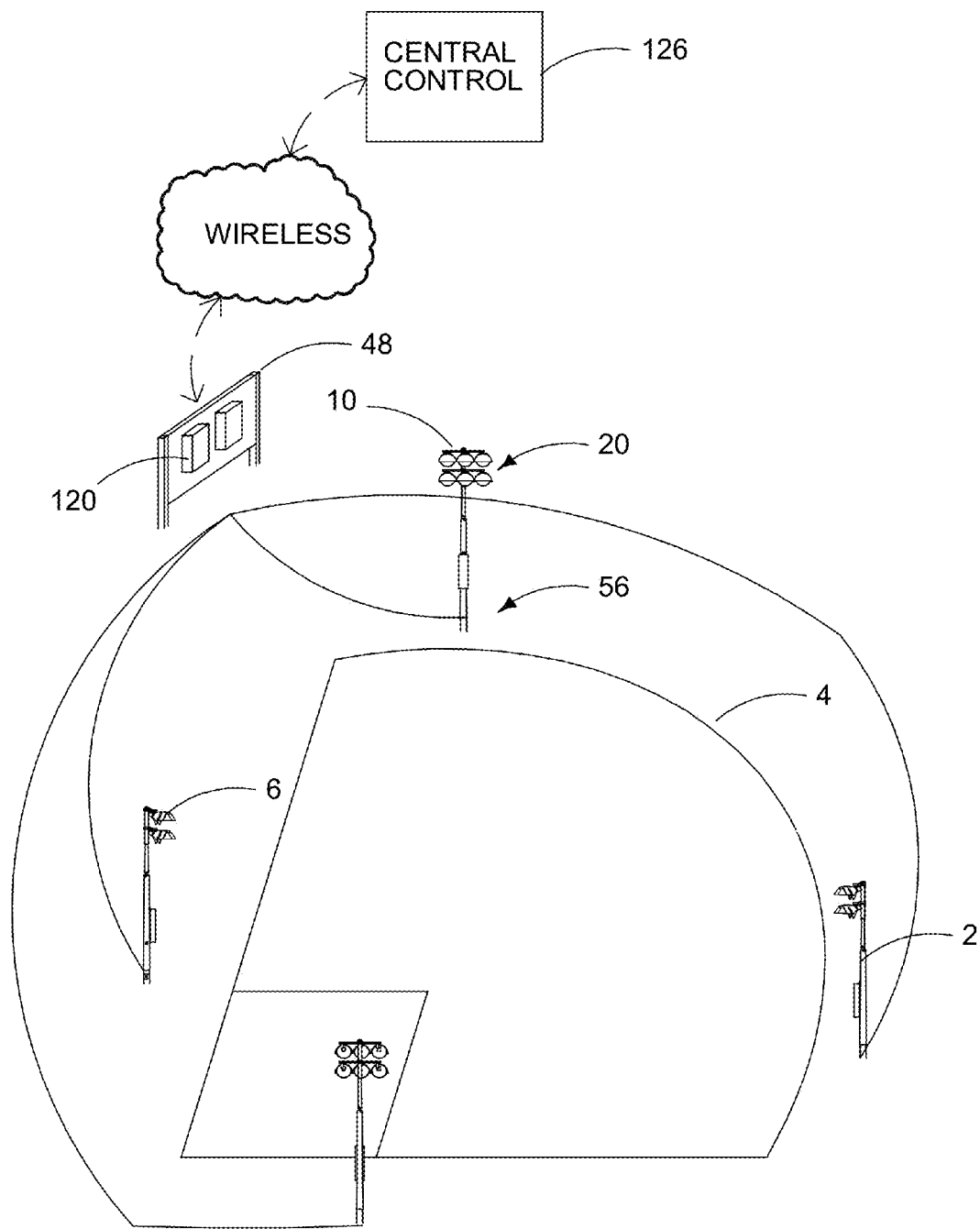
FIG. 1A illustrates a conventional sports lighting system with sports field, mounting structures, fixtures and controls.
Figure 1B:
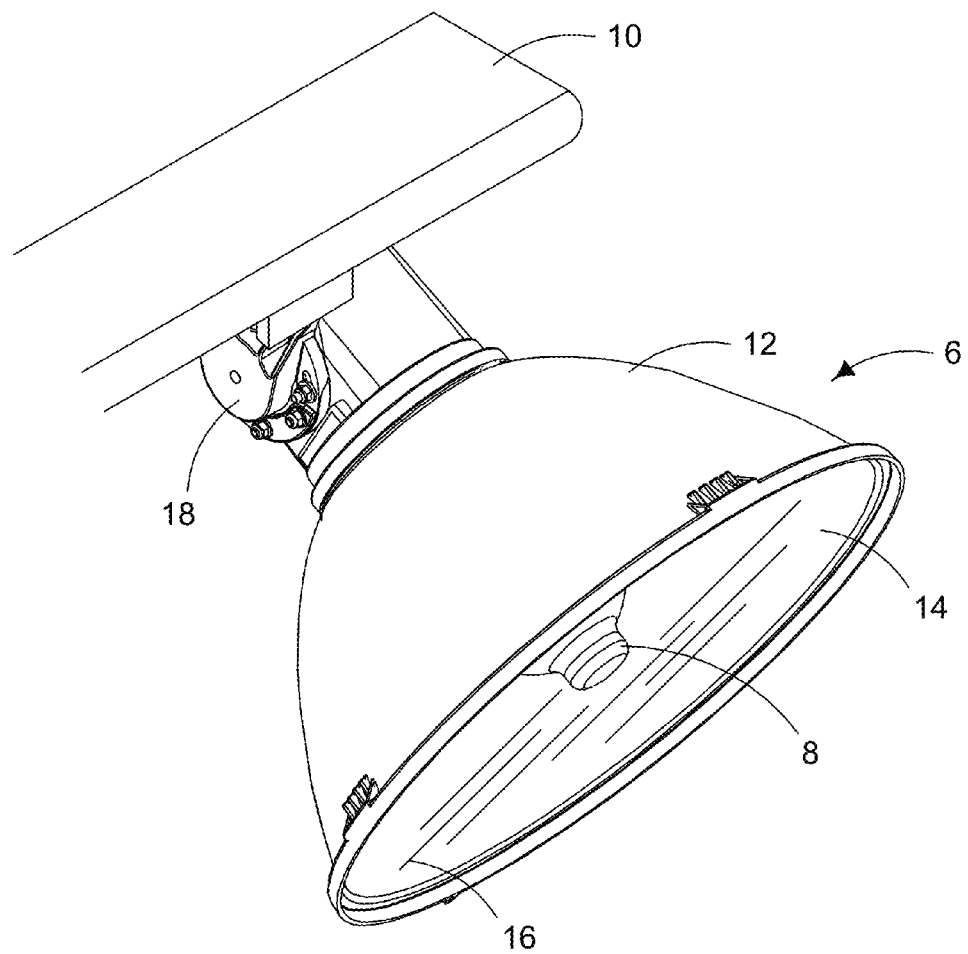
FIG. 1B is an enlarged perspective view of a single lighting fixture from the system of FIG. 1A with external visor removed.

A conventional sports lighting configuration or system is generally shown in FIGS. 1A and B. A plurality of substantially tall (e.g. greater than 30 feet tall) poles 2 are installed at spaced apart positions around a sports field 4. A plurality of light fixtures 6, each with a light source 8 (typically high wattage HID), are mounted on cross-arms 10 at the top of each pole 2. Each of the light fixtures 6 comprises a bowl-shaped reflector or reflector frame 12 with interior reflective surface 14 and glass lens 16 which encloses the light source 8 and reflective surface 14. An adjustable mounting elbow 18 allows adjustable aiming of each fixture 6 from its corresponding cross-arm 10. As is well-known in the art, computer lighting design programs can help design pole/fixture/lamp combinations, and the aiming of the fixtures, to meet minimum light intensity and uniformity specifications for the field (e.g. IESNA standards). Some systems also include a method of remotely turning the lights 6 on/off via the control system 48 and central control 126, such as Musco's CONTROL-LINK® system. See, e.g., (1) publication entitled "Control-Link®—Flexible Control And Solid Management Of Your Facility, Saves Operating Costs And Improves Service", copyright 2003, 2007, publication number B-500-3, available from Musco, and (2) U.S. Pat. No. 6,681,110, both of which are incorporated by reference herein in their entireties. In addition, the system may contain a method to adjust the wattage to the lamp over time to hold the lamp output nearly constant based on the predicted light loss depreciation curve. See, e.g., U.S. Published Application 2005/0184681A1 issued as U.S. Pat. No. 7,176,635 on Feb. 13, 2007, which is incorporated by reference in its entirety herein.

This embodiment of the invention adds the following to that conventional sport lighting set-up:
1. A method, apparatus and system to sense the light output external of fixture.
2. A method, apparatus and system to communicate light output data back to local and/or central processor for evaluation.
3. A method, apparatus and system to communicate lighting performance to customers, clients or other interested parties.

C. Exemplary Method and Apparatus Embodiment 1

Figure 1C:
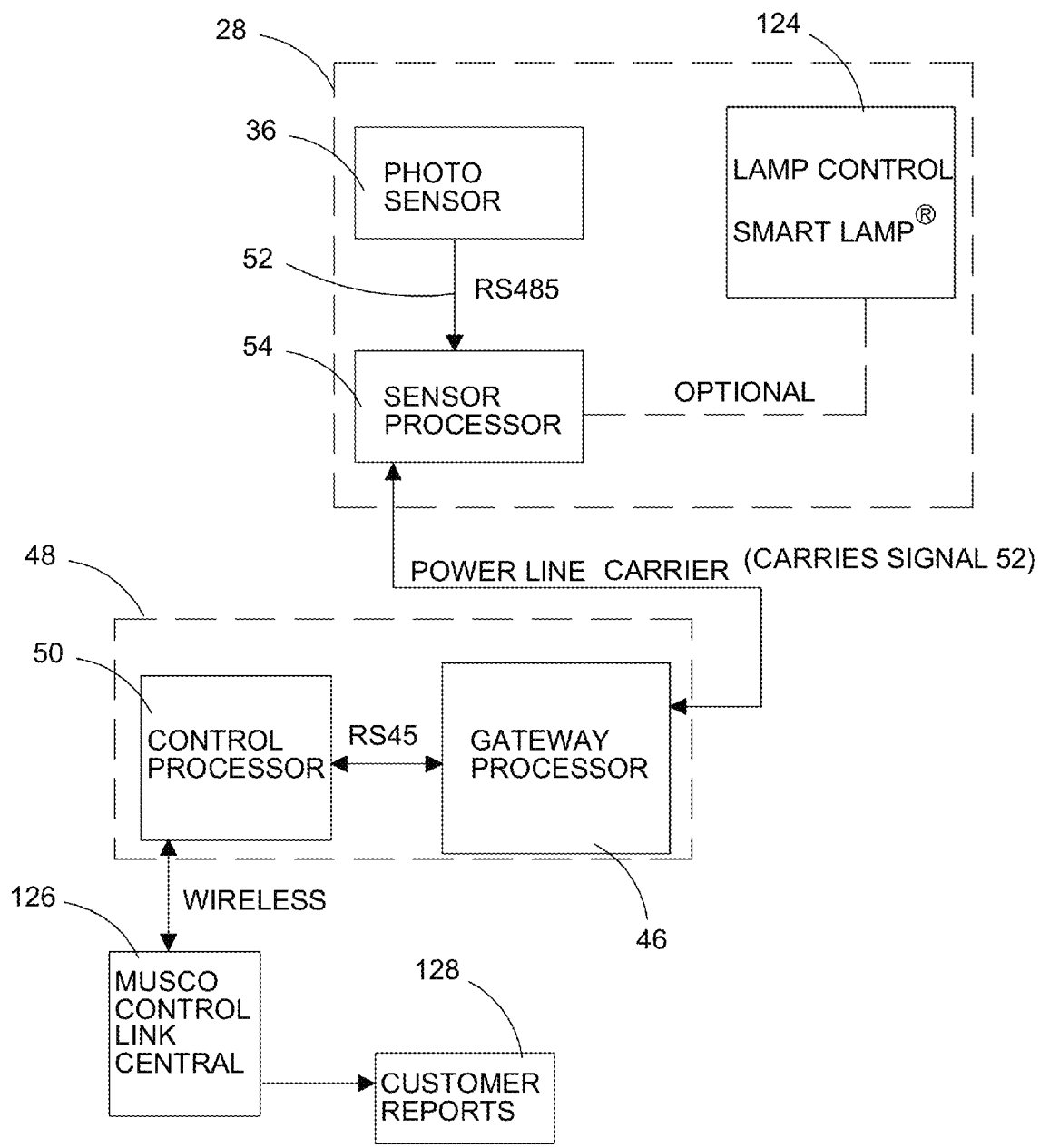
FIG. 1C is a block diagram of a light monitoring method and system according to an exemplary embodiment of the present invention.

Generally, a method according to a first basic exemplary embodiment according to the invention includes the following aspects, as can be implemented in one example as diagrammatically illustrated generally at FIG. 1C:
1. A method of sensing the light output external of light fixture 6, using photo sensor assembly 36.
2. A method of processing 54 the sensed light output from photo sensor assembly 36 and communicating the data to central processor (gateway) 46.
3. A method of automatically, or manually, adjusting the operating power to the fixtures 6 by communicating between sensor processor 54 and lamp control 124 (such as Musco's SMART LAMP® system).
4. A method of receiving light output data from sensor processor 54 and communicating it to gateway processor 46 via power line carrier technology (e.g. PL3120® and PL3150® Power Line Smart Transceivers Models 15310-1000, 15320-960, 15311R-1000, and 15321R-960, commercially available from Echelon Corp., 550 Meridian Ave., San Jose, Calif. 95126 USA, details of which can be found at PL 3120/PL 3150 Power Line Smart Transceiver Data Book, Echelon Part Number 005-0154-01 available from Echelon Corp., downloadable from www.echelon.com, and incorporated by reference in its entirety herein).
5. A method of communicating between gateway processor 46 and main control system 48, in particular control processor 50.
6. A method of remote communication between gateway 46 and control system database 126 for purposes of gathering performance data, analyzing data, and communicating system performance to a lighting system owner or operator via customer reports.

A system and apparatus according to a first basic exemplary embodiment of the invention include the following aspects:
1. A sensor head 36 (FIGS. 3A and B) consisting of photo sensor 22 to sense the light quantity and transmit a signal to the sensor processor circuit 54.
2. A sensor processor circuit 54 to receive the signal from sensor head 36 and transmit signal 52 via a power line carrier to the gateway processor circuit 46.
3. A gateway processor circuit 46 for communication to control unit 50 or other alarm method or data collection and execution method.

Figure 2A:
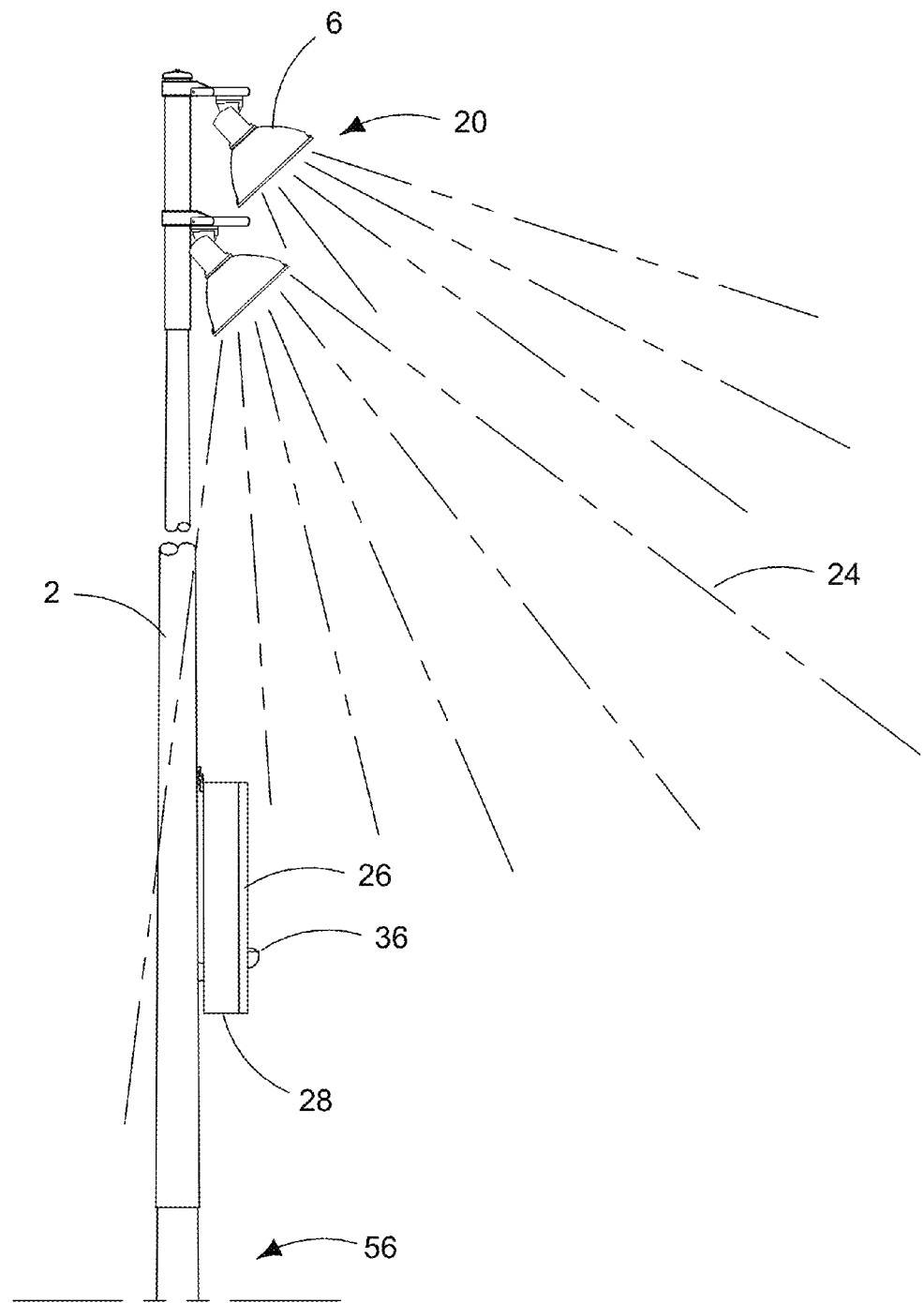
FIG. 2A illustrates a pole with lighting fixtures and other typical electrical equipment to operate HID lamps, and a photo sensor assembly with sensor processor board to monitor actual light output external of lighting fixtures (e.g. from the same pole as the array of fixtures being monitored).

First, at each light array 20 of light fixtures 6 (i.e. mounting pole) location, see FIG. 2A, is photo sensor assembly 36. It can be placed anywhere along the pole 2, but preferably it is oriented directly under light array 20 so that it can sense a level of light energy 24 from the array of plural light fixtures 6 mounted at the top of the same pole 2 to which sensor assembly 36 is attached.

Figure 2B:
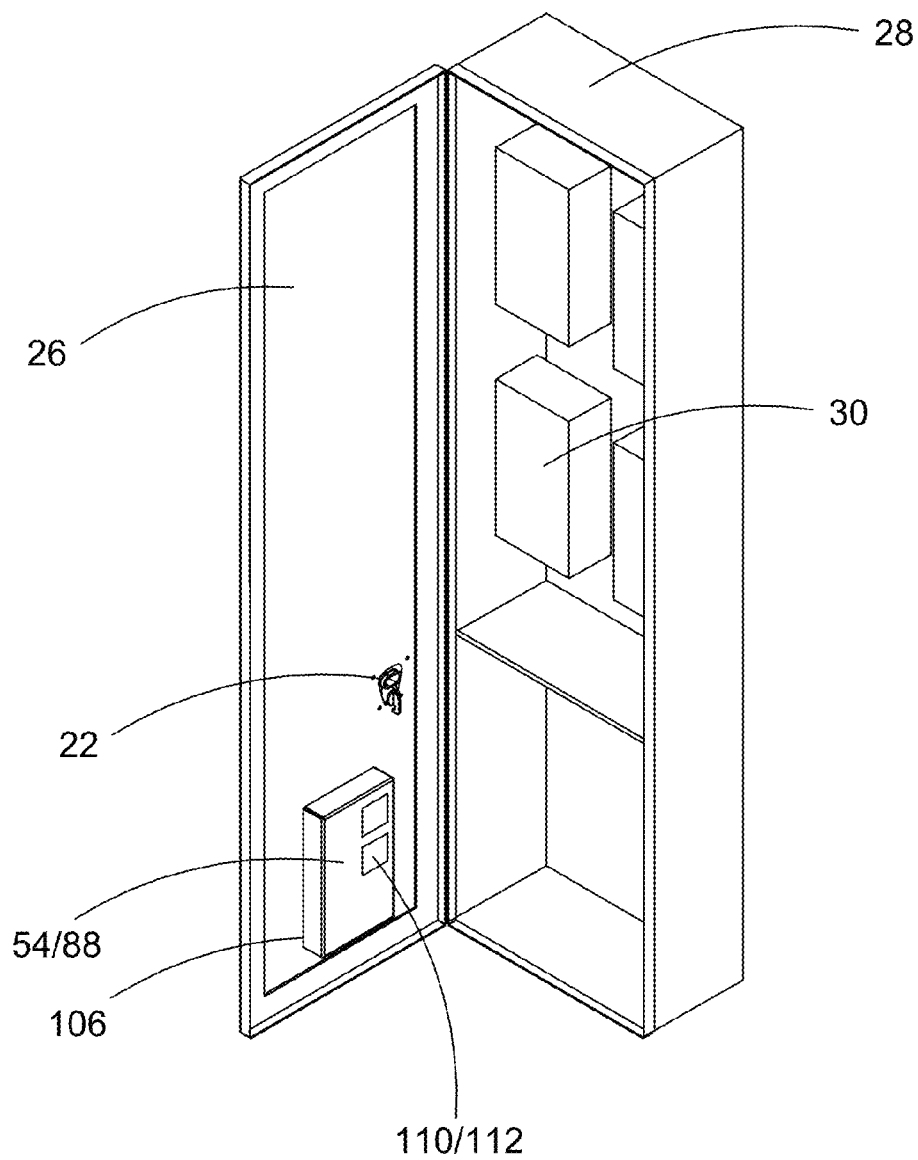
FIG. 2B is an enlarged perspective view of an electrical enclosure or ballast box such as is mounted along the pole of FIG. 2A and with its door opened to shown interior electrical components.

For ease of maintenance and convenient access to necessary electrical power, one convenient mounting location is on the exterior door 26 of the lowest mounted electrical components cabinet 28 for lighting electrical equipment 30 (ballast, capacitors, fuses, switches) on pole 2 (see FIG. 2B). Such cabinets are commonly used and are commercially available from a number of sources, including Musco. For most systems, this will place the photo sensor assembly 36 within reach by step ladder; e.g. generally a distance less than 10 feet above the ground.

Figure 2C:
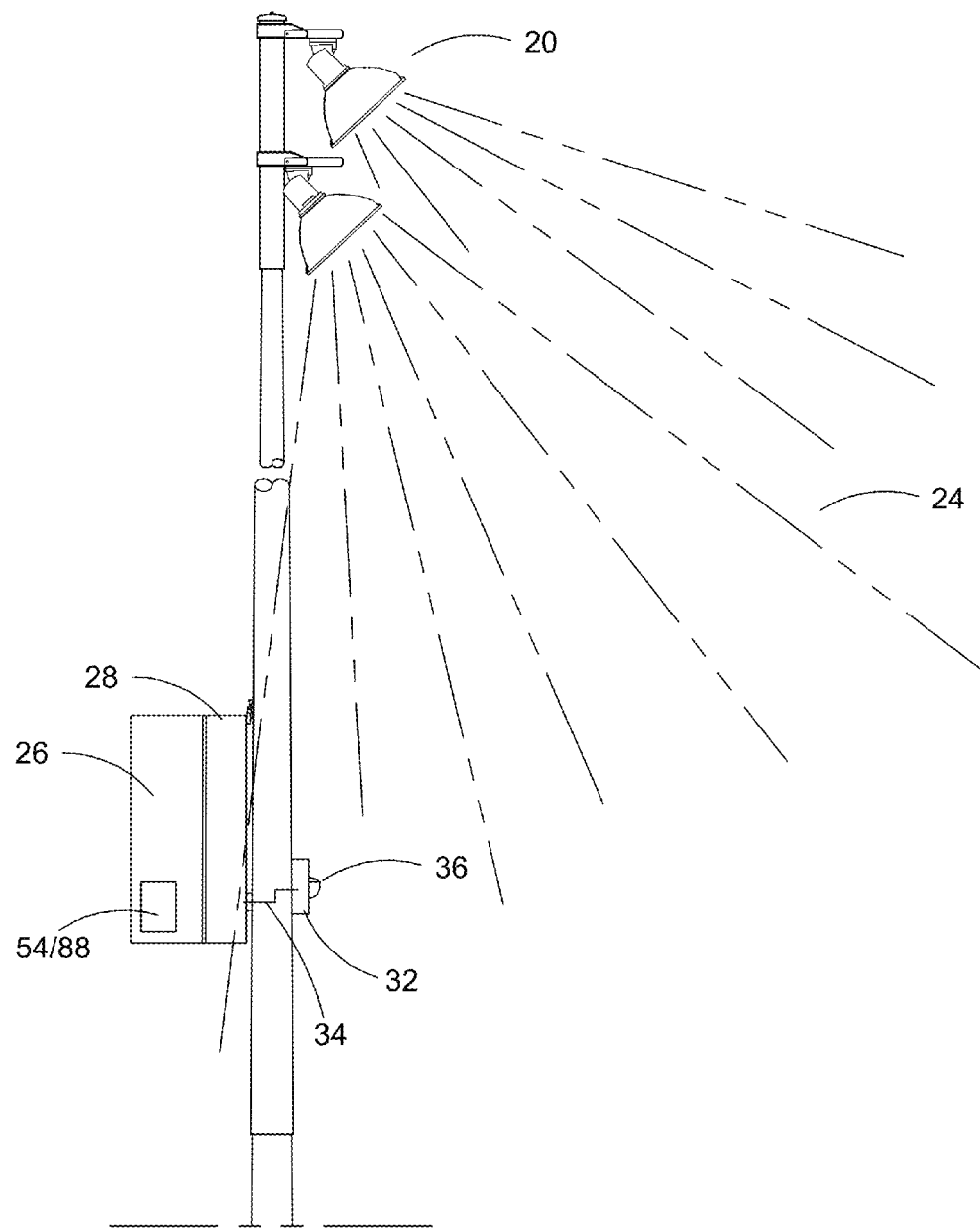
FIG. 2C is similar to FIG. 2A except shows positioning of the enclosure box of FIG. 2B (with door 26 opened) on an opposite side of the pole and a mounting bracket for the light monitoring sensor.

For situations where the orientation of the electrical enclosures 28 for lights 6 is opposite of the light fixture array 20, an alternate location for sensor assembly 36 may be on the pole 2 via, e.g., a mounting bracket 32 (see FIG. 2C) on the same side as the light array 20. Bracket 32 would function as a mounting surface for photo sensor assembly 36 and wireway access into pole 2, which provides access to electrical enclosure 28. As such, bracket 32 can assume many different forms as are well known in the art. A wire harness 34 (shown diagrammatically) could be routed from the photo sensor assembly 36 over to the electrical enclosure 28 where the sensor processor circuit 54 is housed; see FIGS. 2B and 2C.

Photo sensor 22, commercially available (e.g. Model TSL237S from TAOS or Texas Advanced Optoelectronic Solutions Inc., 800 Jupiter Road, Plano, Tex. 75074 USA; details of which can be found at the specification sheet entitled "TSL237 High-Sensitivity Light-to-Frequency Converter, publication number TAOS052D, January 2006, which is incorporated by reference herein), is a component of the sensor head or assembly 36, see FIGS. 3A-G, that houses photo sensor 22, provides a method to view the light energy 24, and protects the photo sensor 22 and associated circuit board 40 from adverse weather and other potential hazards. The weatherproof housing 42 is mounted to the exterior door 26 of the electrical components enclosure 28 with gasketed wireway 44/72 into the enclosure 28 for electrical power and connection to a sensor processing circuit 54; see FIGS. 1C, 2B and 3C. Mounted inside the enclosure 28, sensor processor circuit 54 provides power to the photo sensor circuit board 40 and receives a signal 52 from the photo sensor circuit board 40, sensing the amount of light energy 24, and relays a signal to the gateway processor circuit 46 via power line carrier communication technology (e.g., the Echelon system cited above).

The gateway processor circuit 46 is generally centrally located with the lighting equipment control system 48 (see FIG. 1C). Gateway processor circuit 46 receives the signal from the sensor processor circuit 54 via power line carrier and relays the signal to the control system 48. Power line carrier methodology is an advantageous method of communication between the sensor 22 locations and singular gateway processing circuit 46 at the control system 48 location. A beneficial control system 48 for this embodiment one is the CONTROL-LINK® system manufactured by and commercially available from Musco. Further information can be found at the incorporated by reference Control-Link® publication and U.S. Pat. No. 6,681,110. Other control systems or methods of communicating the signal from the photo sensor can be used and are discussed in embodiment two of this description, and also in the options and alternatives section of this description.

Photo sensor assembly 36 (FIGS. 3A, B, F, G), comprising photo sensor 22 and circuit board 40, produces an output signal 52 that is proportional to the amount of light energy 24 it senses. Each photo sensor 22 is in operative communication with circuit 54, to receive and monitor the signal 52 from each photo sensor 22.

When the lighting system is installed and the lamps are first energized, circuit 54 is calibrated so that the output signal 52 from each photo sensor 22 is considered to be representative of 100 percent light output. Changes in the amount of light energy 24 measured by a photo sensor 22 are directly proportional to the change in light level on the target area (e.g. at the sports field 4 to be lighted). If the sensed light energy 24 falls below a preset threshold setting, an alarm signal can be generated by the gateway processor circuit 46 or the control system 48. Essentially, the system performs a comparison with a comparator between the actual measured light output and a preset reference value (the threshold). The alarm can be any of a number of things or actions. For example, it can be something perceivable by a human sense (e.g. audible or visible) (whether internal of the enclosure box or external). Another example is a signal that can be communicated to another device or location (e.g. a cellular telephone call to a maintenance worker or company or a wireless internet communication to a central control). The alarm can be some type of notification intended to provoke action, or at least a check of the lighting system.

In this embodiment, the threshold is set at 85% relative to the 100% calibration level discussed above. The basis for 85% is as follows. It assumes the initial LLD (until lamp stabilization) will decrease lamp output by about 10%. It then gives about 5% additional light loss from the fixture, regardless of cause (e.g. things other than LLD), before alarming.

It is to be understood that a benefit of this approach is that the monitoring is of actual light external of the fixture or any component of the fixture and directly relative to the amount of light at the target. It is therefore automatically sensing a light level decrease for any cause. It could be solely LLD. But it could also be such things as LDD (e.g. dirt accumulated on the lamp lens, or out gassing on the reflective surface of the reflector or the lamp or the lens), or it could even be because of failure of the lamp or loss of power to one or more lamps (lamp failure). It can be just about any lumen depreciation or light loss factor.

By this non-complex and economical combination, the circuit 54 communicates the light level to the gateway processor circuit 46, which can signal an alarm to the appropriate personnel to at least go and check the lighting system to determine what has happened, and decide what to do, if anything.

The personnel contacted can be deemed those best for a certain alarm, or it could be the same personnel for all conditions of alarm. For example, a burnt-out or failed lamp can be replaced by contacting a company that has the correct inventory of lamps and the equipment to elevate a worker to the fixtures many feet off the ground. On the other hand, a lens that has mud or debris which blocks, absorbs, or scatters light can simply be cleaned off by appropriate personnel.

But further, an alarm may simply mean that more than 5% additional lumen depreciation has occurred since lamp stabilization. A maintenance worker is not needed for this condition. This information could be used to increase operating power to the lamp an approximately commensurate amount to increase lamp lumen output to compensate for this 5% loss, and bring the light level back to roughly its level at lamp stabilization time. This could be done by contacting a worker and having a manually-operable switch or control at the lighting system to operate. It could also be done by installing an automatically operating system at the site of the lighting system (e.g. Musco SMART LAMP® system). But it also could be accomplished remotely. The Musco CONTROL-LINK® system is an example of how remote control of power to the lamps of the lighting fixtures could be handled remotely.

Optionally, the system can include a means to reset it (manually or automatically) after a check or adjustment to the lighting system has been made. It will therefore continue to monitor the lights of the lighting system for any lumen drop at or over about 5% and, if so, generate another output signal or alarm.

This can be repeated indefinitely. The photo sensors and circuitry are robust and long lasting, or are relatively economically and easily replaced if they fail.

Thus, this exemplary embodiment one goes away from using manufacturer's generalized estimates for LLD (or LDF), and instead engages in essentially real-time automatic sensing of the quantity of light at the field (the target of the lighting system). It also does not rely on measuring voltage, current, or resistance of each lamp to try to sense light output. It also does not require human workers to periodically go to the sports field and measure light levels with instruments such as light meters or the like. It utilizes some information about lamp LLD, but also measures any source or cause of lumen loss. This can be important to maintaining a relatively constant light level at the target over the many thousands of hours of normal operating life of such HID lamps, and still further, over the decades of normal life of such lighting systems.

For example, even if a SMART LAMP® system is added to the lighting system to periodically raise operating wattage of the lamps in anticipation of predicted LLD, out gassing, and/or dirt on the lens, the predicted compensation for loss in light may be insufficient and not properly addressed.

It should be understood that this exemplary embodiment could be used without SMART LAMP®. It would signal or alarm whenever sensed light level drops below the threshold. The maintenance worker could then check the lights for any possible cause for the lumen drop and, if determined to be only LLD, could increase operating power to a lamp in any of a number of ways. But an alarm or signal from the circuit of this exemplary embodiment could also cause the maintenance worker to check if any lamp has failed, or to check for out gassing, dirt on lens, or other causes. Some of these circumstances could be easily resolved (e.g., dirt cleaned off the lens). Any increase of operating power to compensate for LLD could then be lower than if it were assumed the lumen drop was solely because of LLD.

If a SMART LAMP® type system is used, a few examples of ways to increase operating power to an HID lamp are set forth below. Others are possible.

Option 1—Increase Capacitance

To increase the operating power to a HID lamp, the capacitance can be increased by wiring additional capacitors in parallel to the main capacitors. This can be done manually as needed by field retrofitting the electrical system or can be done automatically with a system such as Smart Lamp®.

Option 2—Increase Primary Voltage

To increase the operating power to a HID lamp, the primary voltage can be increased.

In one embodiment, the output signal 52 from the photo sensor circuit would communicate to a central controller 126 or computer (see FIG. 1C). One method of communication would be CONTROL-LINK®. It uses a wide area network (e.g. digital cellular network, wireless internet, or other communication network or link) to communicate bi-directionally with a plurality of sports lighting systems distributed across any geographic region (e.g. whole continents). The photo sensor circuit can communicate its output signal or alarm to a controller that is local to a lighting system, and which can control magnitude of operating power to the lamps of the lighting system, which then makes a communications link back to the central control. The central control can be programmed to do any of a number of actions automatically.

One example would be to send an instruction back to the local controller to increase operating power to one or more of the lamps of the lighting system. Another would be to automatically initiate a call to appointed maintenance worker(s) or other person(s) or entity(ies) to go check on the lighting system.

An advantage over the SMART LAMP® methodology is that it would only instruct operating power increases at approximately the precise time sensed light level drops below the threshold. In contrast, SMART LAMP® simply makes increases on pre-determined times regardless of whether there has actually been a decrease in lumen level.

1. Detailed Description of Embodiment 1

As described above, three main components make up the light monitoring system. They are the sensor head 36, sensor processor circuit 54, and gateway processor circuit 46, FIG. 1C. The sensor head 36, FIGS. 2A and 3A, is located and mounted at the light fixture locations 56, FIGS. 1A and 2A, and mounted on an exterior surface of electrical cabinet 28 or pole 2. The sensor processor circuit board 88, FIG. 2B, is also mounted at the light fixture location, but it is mounted inside the electrical components enclosure 28 along with the electrical equipment 30 (ballast, capacitors, fuses, etc.) to power the fixtures 6. The gateway processor circuit board 58, FIG. 4, is mounted inside the centrally located control system 48 enclosure. In this regard, it is remote from the sensor head 36 and sensor processor board 88, remote by distance of many feet, generally on the order of two to three hundred feet or more. The following is a detailed description of each main component and how it interacts with the system.

The sensor head 36, FIGS. 3A-3G comprises a housing 42 with removable clear lid 60 to protect the photo sensor 22 and electronic circuit board 40 from adverse weather conditions. Cast acrylic was chosen for this application, although other materials (including of equal or greater clarity and durability) could be used. The lower housing 42, mounting plate 62, and hood 66 can be tinted to match the color of the enclosure box 28, while the upper dome (lid) 60 is translucent to allow for transmittance of light. Mounting plate 62 holds circuit board 40, containing photo sensor 22, and top filter plate 64 with filter 80, all snapped together in place. Three screws 130 secure hood 66 and mounting plate 62 (with the above components) onto lower housing 42. Wires 34 (FIG. 3F) pass through wiring port 70 on the back of housing 42. The housing is nitrogen purged and sealed to protect the components against moisture and help reduce condensation. To seal wiring port 70, wiring 34 is extended through the port 70 and then potted in place with epoxy. Furthermore, to prevent air leakage through the wiring 34, wires 34 must be solid core (not stranded) and the insulation of the wiring is center stripped at the port 70 intersection to ensure direct contact between the wire and epoxy. This prevents air from seeping into the photo sensor housing 42 inner chamber 122 (FIG. 3G) through the wires 34 insulation.

Once assembled, lid 60 is ultrasonically welded to the lower housing 42 to produce an air tight seal. The inner chamber 122 is then nitrogen purged to remove all moisture and create a sealed environment. Once purged, the nitrogen port 68 is sealed with plug 37 (FIG. 3G) by solvent welding the plug 37 into the port 68. This prevents condensation on the inside of the clear lens 60 that could impact the measurements. To further prevent any condensation on the interior of lens 60 and dew or frost on the exterior of lens 60, which may impact the sensing ability, a small heater 121 (FIG. 3B) can be used. In this embodiment the heater is comprised of a 3 watt metal oxide type power resistor that is duty cycled to maintain the desired temperature under the lens. The critical area of the lens is the viewing area defined by aperture slot 84. The temperature inside the housing is maintained at 3-4 degrees above the outside ambient temperature to prevent condensation and dew. The resistor is positioned near the lens to allow the heat from the resistor to radiate to the lens. The duty cycle of the resistor is controlled by the sensor board and determined based on local weather conditions (i.e. temperature and humidity) for the installed location. The duty cycle of the resistor can be increased as needed for special cases, such as frost, snow or ice. An alternative method to prevent condensation or frost on the exterior of lens 60 directly above the slot or aperture 84 in hood 66 (which can be opaque), slot 84 being aligned over sensor 22, an electrical resistance heater (similar to a rear window defroster of an automobile) could be applied to the interior of lens 60 and powered from the light sensor circuit board 40. One example would be a clear plastic disk with the heater wires embedded therein in a grid that has a plurality of wires going out radially from the center (see diagrammatic depiction of such a heater 123 in dashed lines in FIG. 3B). The disk could be adhered to the inside of the lens. An example is Thermal-Clear™ Transparent Heater from Minco, 7300 Commerce Lane, Minneapolis, Minn. 55432, U.S.A. (www.minco.com) Other methods of keeping condensation or frost from interior or exterior sides of the lens are possible. Also, if not nitrogen purged or the nitrogen purging fails, such a small heater would help reduce the moisture inside the housing.

The housing 42 can be constructed of any durable material suitable for exterior environment. Some materials could be cast metallic materials painted to match the equipment or cast acrylic tinted to match the equipment color. A clear lid 60 of cast acrylic could be used with either type of material for housing 42. The housing 42 not only can include the port 68 for the nitrogen purge, but also the exit port 70 for the wiring 34 from the sensor head 36 to the sensor board 88 traveling through the enclosure door 26. Gasket 72 is installed between the photo sensor assembly 36 and the exterior door 26 mounting surface, FIG. 3C, to prevent moisture from entering the enclosure 28. The photo sensor assembly 36 is secured to the mounting surface 26 via screws 74 from inside the door 26.

Inside the housing 42 the relatively small circuit board 40 with photo sensor 22 and electronics is mounted to tabs 76 and pins 78 molded into the mounting plate 62. Above the circuit board 40 is plate 64 with mounting for the photo sensor filter 80. The filter 80 is mechanically held by tabs 82 on the mounting plate 64 over a through-hole aligned with the photo sensor 22, and can be changed out with varying types of filters. Above the filter 80 plastic molded hood 66 with aperture slot 84 to control the amount of light visible to the sensor 22 is attached. The slot 84 is fixed to provide viewing angle of 20 degrees from the center of the photo sensor 22 to the edges of the slot 84 parallel with the lighting cross arm 10 and four (4) degree viewing front and six (6) degree viewing back (see FIGS. 3D and E). Alternatively, other viewing angles or a variable aperture could be used to increase, or decrease the amount of light viewed. Or a different filter could be installed to vary the amount of light incident on the photo sensor. The details of the housing 42 and circuit board mounting 62 could take many forms. The shape of the housing 42 and lens 60 should be designed to promote shedding of rain and snow and to discourage birds from sitting or nesting. In this, the lid 60 is domed shaped for this purpose.

The sensor head circuit board 40 is approximately one inch square and includes photo sensor 22 and capacitors and resistors and a line driver to boost the signal for extended range. The photo sensor 22 comprises a silicon photodiode that responds to the light and interacts with a current-to-frequency converter to produce a frequency output 52 in a square sine wave form. An example is TAOS model TSL237 or similar. For best results, the desired frequency 52 should be in the range of 1-50 Kilohertz. The frequency 52 produced is directly proportional to the "viewed" light intensity by the photo sensor 22. Hence, aperture 84 is used to control the amount of visible light to the photo sensor 22, keeping the frequency 52 in the desired range for most sports lighting applications and typical target light levels. Since the aperture limits the viewable light to the sensor, the light intensity is much less than the total system. The viewed light is representative of the light on the target area.

As shown in the Figures and description of the exemplary embodiment, light sensor 22 is mounted on a pole in a position below one or more lights elevated on that same pole. The "field of view" of the sensor is controlled by the aperture over it. As can be appreciated by those skilled in the art, the field of view can be controlled by appropriate configuration of the sensor and aperture to take in whatever light from fixtures on that pole that is possible to receive, but try to exclude light from, e.g., other poles or other sources. By empirical testing or laboratory or computer simulation, the threshold level of light for that pole from that sensing position can be set. If the sensed light quantity drops below the threshold, a signal can be generated by the circuit. It can be appreciated that sensor 22 may not actually see light from every fixture on its pole. For example, one or more fixtures may have an aiming angle that does not result in any part of its beam falling on sensor 22. While this would likely not result in being able to monitor that/those lamps individually (e.g. detect if they individually fail), it still allows a threshold to be set for that sensor monitoring position and pole/fixture setup, and signal if a relative light quantity drops below a calibrated level. On the other hand, for some pole/fixture combinations, sensor 22 would receive light from all fixtures and thus essentially monitor the set as well as individual fixtures. By empirical methods or simulation in computer-aided lighting design software, an appropriate predicted light quantity from the fixtures on that pole based on the viewing angle and position of the sensor can be estimated for the horizontal plane corresponding with the mounting height on the pole for the sensor. This could be correlated to a light quantity specified at the field. It could also be adjusted or weighted based on how many fixtures on the pole the sensor "sees" in relation to total estimated light output from all fixtures on that pole.

But it is to be understood that the light sensor could be set up to view and monitor light from light sources other than the pole to which it is mounted. It can be set to view and monitor virtually from any direction. One example would be to point the sensor and configure its viewing aperture so that it views light from fixtures on a pole from across the field, and exclude view of light from fixtures on the pole to which the sensor is mounted. This may require some variation in calibration. There may have to be some weighting or adjustment of threshold based on well-known principles of light (e.g. the greater distance to the opposite side of the field). The viewing aperture may have to be narrowed to try to exclude light other than from the pole across the field.

Essentially, the sensor could be placed almost anywhere if it "sees" some light from the lighting system/fixtures to be monitored. It could be on a pole of the lighting system, or other elevated structure, but could be on a separate structure (e.g. its own pole, a fence, a grandstand, a flag pole, a press box, etc.). Also, there could be one sensor per pole or one per entire lighting system for a field or application (e.g. all poles and fixtures for one field), or any number desired. Furthermore, one sensor could monitor fixtures on one pole. But it could monitor fixtures from two or more poles. As can be appreciated, the designer of the system with the monitors can select different configurations of number and position of sensors. They would be configured and calibrated accordingly.

An additional method of controlling light to the sensor would be to use light blocking filter 80 to reduce the light intensity passed to the photo sensor 22 and to filter out any non-visible light. Additional discussion and application of such filters is set forth below relative to set up and operation of the sensor(s) according to this embodiment.

At the initial light verification of the target area, the sensors 22 are calibrated for the present light level. This light level establishes the baseline with the threshold level set to correspond with the minimum light quantity allowable for the target area. In this embodiment, the threshold is set as a frequency level; generally a percentage lower than the target level. There is a direct relationship between quantity of light received at sensor 22 of the type in this embodiment and the frequency it outputs. For example, if the light level is designed to be constant within +/−10 percent of the designed level, then the threshold would be set at the frequency that represents the 10 percent less than the designed light level.

In this example, filter 80, FIG. 3B, is a small piece of glass with thickness of generally less than 1/16 of an inch (2 mm) with both an infrared (IR) coating and ultraviolet (UV) coating applied to the glass to restrict the light wavelengths to photo sensor 22 to just the visible wavelengths in the range of 400-700 nanometers. Since IR light wavelengths (>750 nanometers) and UV light wavelengths (<400 nanometers) are outside the visible light spectrum, but potentially sensed by the photo sensor, these wavelengths must be filtered out to ensure accurate measurements. Depending on the range of the photo sensor 22 used and the wavelength range of the light source, additional filtering may be needed.

Frequency 52 from the sensor head 36 is transmitted to the sensor board 88 mounted inside the electrical components enclosure 28 via the wires 34. The sensor board 88 collects lighting samples up to 1000 per each 15 seconds and determines an average. The sensor processor circuit 54 then sends the average for each 15 second interval to the gateway processor circuit 46 at the main control panel 48. The sensor processor circuit 54 serves two functions, one to communicate and interpret data from sensor 22 and second, communicate that data to the gateway processor circuit 46 via power line carrier technology.

In this embodiment of sensor 22, for accuracy its output is kept under a maximum frequency (e.g. the maximum is 52 KHz and the output is kept under 50 KHz—for example, 1-50 KHz). Because different quantities of light might be received by sensor 22 for different positions and viewing orientations, an appropriate filter (such as are commercially available and well known) can be used, if needed, to reduce the quantity of light received by a sensor 22. For example, if a reduction of approximately 10% of light quantity is needed to keep the sensor output within the 1-50 KHz range, an appropriate filter can be placed between the sensor and the received light to only let approximately 90% of the light through.

An optical attenuator is a device used to reduce the power level of an optical signal. Different methods can be used. The term is frequently used with respect to fibre optics applications, where attenuation is commonly made using the gap-loss principle. However, the term also applies to free space light applications (e.g. with cameras). Common attenuation methods use absorptive or reflective techniques. Optical attenuators can be fixed or variable (e.g. step-wise variable and continuously variable.)

The correct optical attenuator can be selected for the given application. For example, using computer lighting system software, a designer could estimate the light quantity to be received at a horizontal plane at the light sensor for a given position relative to a set of light fixtures. If the light quantity would exceed the maximum frequency, the designer could select an optical attenuator having characteristics appropriate to reduce the quantity to within range. Towards that end, the designer could keep on hand a set of optical attenuators of different attenuation values and select the appropriate one, if any, for each sensor 22.

As can be appreciated, each type (model and manufacturer) of sensor 22 can have different characteristics and criteria. Therefore, the need for and the magnitude of attenuation can vary for different sensor types. Also, the range of acceptable light quantities may vary from sensor type to sensor type. For example, if a sensor that normally will function well for lower light quantities, with or without an optical attenuator, will experience an extreme quantity of light, a different sensor may have to be selected and used (with or without an optical attenuator).

The sensor board 40 also includes a capacitor connected to the photo sensor 22 to provide a means to decouple the power supply as recommended by the photo sensor manufacturer (See incorporated by reference TAOS TSL237 publication, page 5—"Power-supply lines must be decoupled by a 0.01 μF capacitor with short leads placed close to the TSL237 (FIG. 3). A low-noise power supply is required to minimize jitter on output pulse.").

Four wires 34 connect the sensor head circuit 38 to the sensor processor board 88 via a quick connector plug 90, FIG. 3F. Wire 92 provides the +5VDC to the circuit, wires 94 and 96 provide the communication network via RS485 protocol, and wire 98 is ground. Since the power is low, relatively small wires in the range of 20 ga can be used. If the sensor head 36 is located at a remote location away from the sensor processor board 88, then the four wires of harness 34 (wires 92, 94, 96, 98) should be protected by a harness wrapping to prevent potential damage and shielded to prevent noise interference from the high voltage. A quick connector 90 is recommended to facilitate a removable connection to the sensor processor board 88, such as may be needed for maintenance or replacement of either the sensor head 36 or the sensor processor board 88, or any components thereof.

The sensor processor board 88 should be mounted relatively close to the sensor head 36. In the exemplary embodiment, the sensor board 88 is located just inches away from the sensor head 36. The sensor head 36 is mounted on the exterior door 26 of the lighting electrical components enclosure 28 with the sensor processor board 88 mounted to the interior side of the enclosure door 26. Locating the sensor processor board 88 inside the electrical cabinet 28 provides convenient access to the electrical power for the step down transformer 102 (FIG. 4) and provides connection to the power lines 104 for power line carrier communication method, as shown in FIG. 4. The sensor board 88 is mounted to a sheet metal housing 106, FIG. 2B, that is mounted to standoffs welded to the door 26. The housing 106 is designed to provide general protection to the circuit board 88 and prevent exposure to high voltage. Access ports 110/112 to the electrical and communication connections are provided in the housing 106. The housing 106 is not designed to be weather resistant or shield from temperature since it is located inside a protective cabinet 28.

To provide the desired 18VAC to power the sensor board 88, step down transformer 102 is used to convert high voltage, up to 480 volts alternating current (VAC), down to the 18 volts AC. Since the operating voltage of the lighting system may vary between 120 to 480, step down transformer 102 must accommodate this voltage range. In this embodiment, the HID ballast 113 is specially manufactured with a 240 volt primary power tap 114 that can be used as primary power to the step down transformer 102. Using this 240 volt ballast tap 114 simplifies the range of voltages the transformer 102 needs to accommodate, which also simplifies wiring. Two power wires 116 connect to the sensor processor board 88 to provide the 16-18 VAC power (also labeled wires 3 and 4 on circuit diagram, FIGS. 5A and B).

Figure 5B:
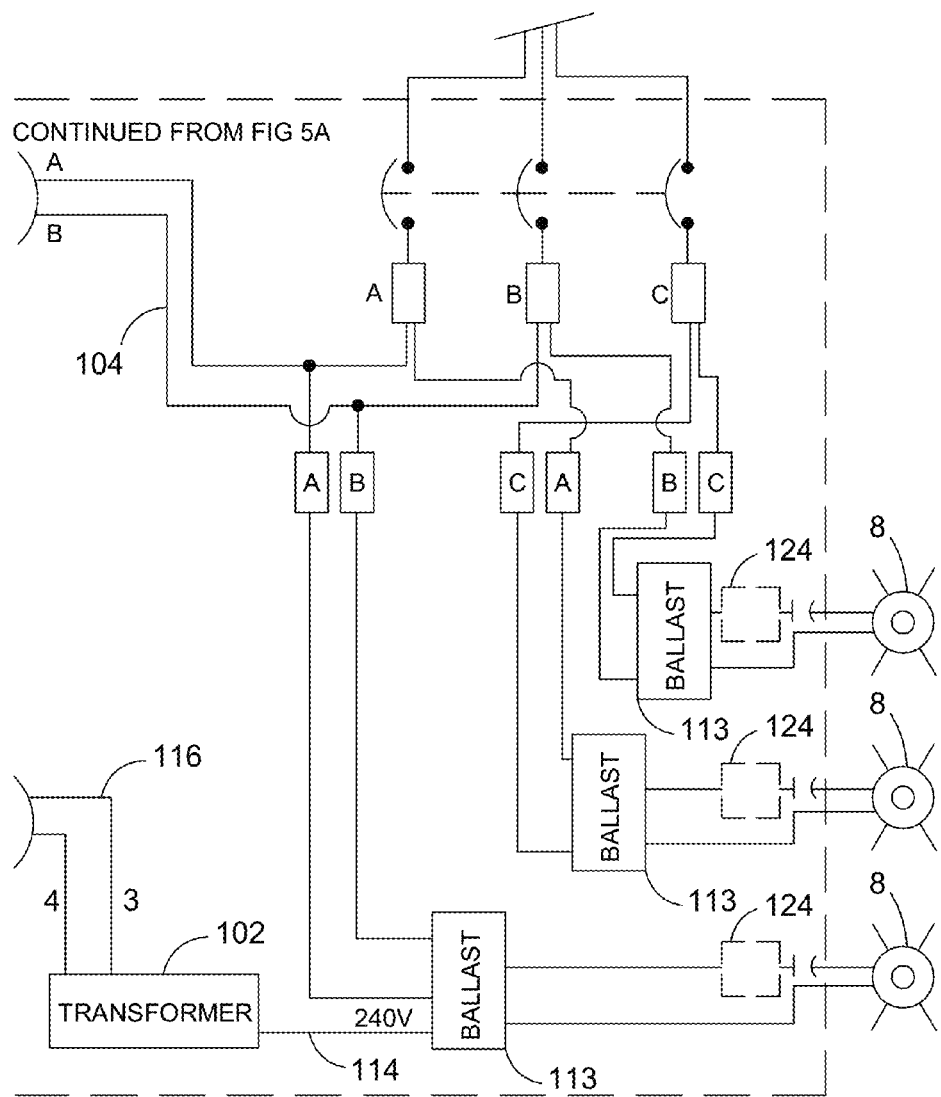

The sensor processor board 88 is a backplane board, FIGS. 5A and B, that contains two power supplies, power line carrier coupling circuit, address switches, power line carrier neuron module, temperature sensor circuit, interface circuits for RS485 to sensor head and external auxiliary diagnostic RS232 interface (see FIGS. 4, 5A and 5B).

The power supplies convert the 18 volts AC power to +15 volts DC for the power line carrier transmitter. The other power supply converts the same 18 volts AC to +5 volts DC for the logic circuits. The power line coupling circuit provides the connection between the high voltage power line wire 104 (FIG. 4) and the neuron module 55/88 (FIG. 4). This circuit protects the electronics from damage from the high voltage.

Address switches provide a unique identifier for the sensor board. A domain address switch is included if multiple gateway modules are present. This allows all the circuits on the sub-network to be identified as a group. If a self-installing mode is used, then the physical address switches will not be used, but can be replaced with system set identification.

The power line carrier neuron module is part of the power line carrier technology that is provided by Echelon Corporation. This circuit uses the PL3150 Smart Transceiver from Echelon as its processor. The firmware is developed by the user. The circuit also includes a transmitter to place data on the power line and a receiver to pull data off the power line. A small amount of memory is present to store network variables. The firmware used will collect the samples from the sensor head circuit and average up to 1000 samples taken in each 15 second interval. Each average is then sent to the gateway module via the power line, then in turn sent to the control processor 50 for storage in memory.

A temperature sensor circuit (FIG. 6A) measures the ambient temperature for the sensor processor board 88 and also sends this data to the gateway processor circuit 46 via the power line carrier. One purpose would be to monitor temperature so that heat would not cause a failure of components. It also has the capability to monitor and sense other things (e.g. changes in the operating temperature of the unit and environment).

The interface circuits on the sensor board 88 are used to communicate with external devices. The board contains connection points to provide the power and RS485 communication protocol to the sensor head 36. The RS485 method helps to eliminate noise due to its differential pair technology. A connection point for an auxiliary diagnostic RS232 interface allows connection to devices with standard hyper terminal. These types of interface circuits are well known to those in the art. Additional types of interface circuits and connection points may be included on the sensor board if other applications beyond the functions of embodiment 1 require it; see FIGS. 4, 5A and 5B.

Figure 6B:
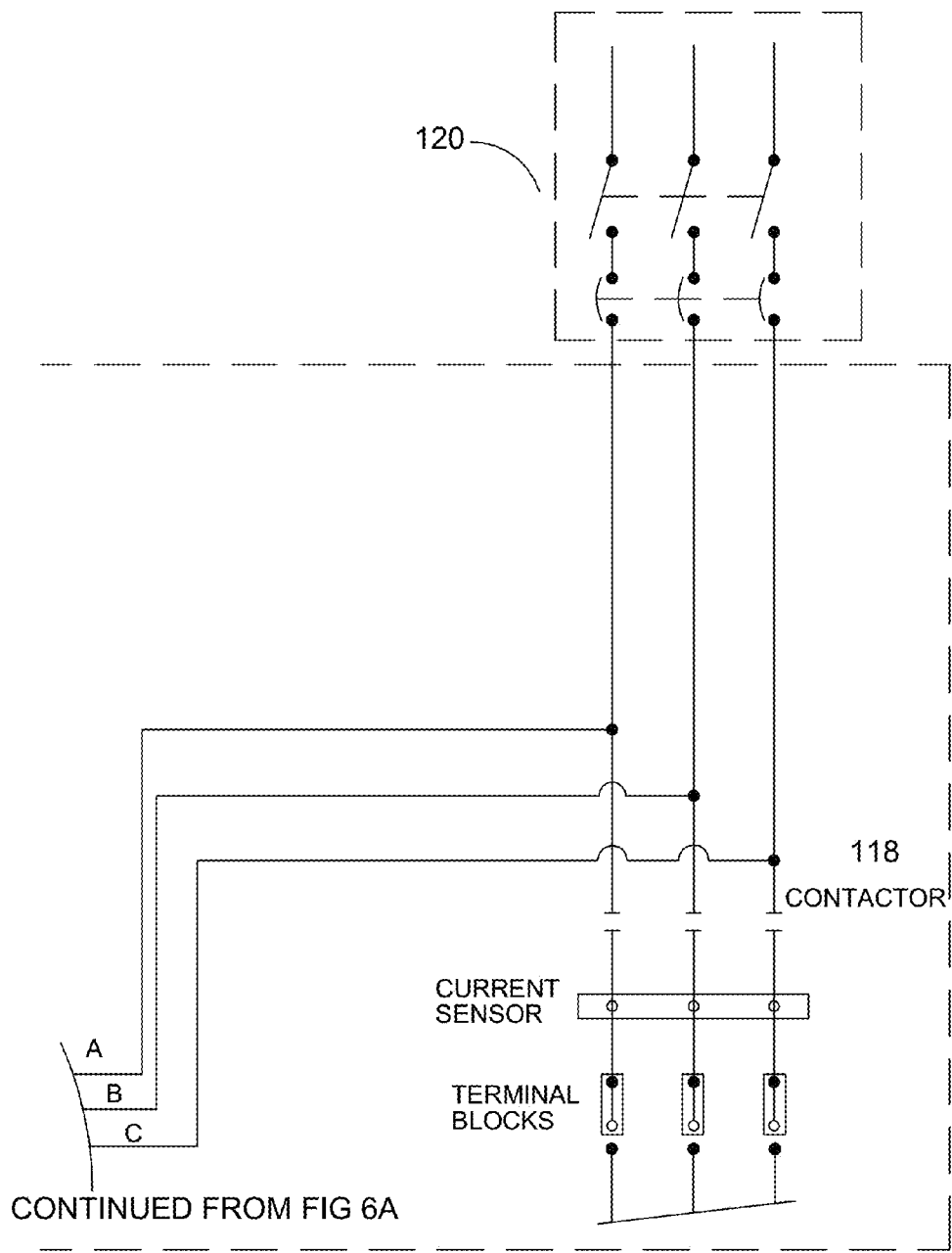

At the control cabinet 48, the gateway module 46, FIGS. 6A and 6B, communicates with the sensor module 54 via the power line carrier. The connection to the power line is from the first contactor 118, FIG. 4, but since gateway 46 is connected to all 3 phases, in effect it is connected to all electrical equipment on that electrical service panel 120. The gateway processor circuit 46 is connected also to earth ground, FIG. 7. In this manner, the gateway 46 is able to communicate with multiple sensor circuits 54 that are connected to any one of the phases and also to earth ground. In this system, the power line carrier system uses the earth ground as the return path, since a neutral is not available with the typical voltages present for sports lighting.

The gateway 46 contains the neuron processor (see module PL3150 in gateway board 46/58 in FIGS. 6A-B) to communicate with the power line carrier and also a micro-processor to store the data and transmit it to the control processor module 50 (FIG. 1C) of Musco CONTROL-LINK® system. In other embodiments, the micro-processor could be configured to send a signal to a warning light, or some sort of alarm to the facility manager that the lights are below threshold.

The gateway processor circuit 46 provides the communication method between the sensor circuit 54 located at the lighting pole and the control module 50. Hence the term gateway. Communication with the remote sensor circuits 54 is via power line carrier and the communication with the control module 50 is via RS485. The gateway processor board 58 is mounted inside the main control cabinet along with the lighting contactors 118 (FIG. 4) that provide power to the lighting circuits and the control systems 48 that provide the switching control over the contactors.

The gateway processor circuit 46 includes the same neuron module as the sensor circuit 54, only with different firmware, an additional microprocessor 8031 chip, temperature sensor, and interface circuits for RS485 to the control module 50.

D. Exemplary Method and Embodiment 2

Another exemplary embodiment would use photo sensors and a circuit such as described in Embodiment 1, with the following differences. Instead of CONTROL-LINK®, other communication and control methods could be employed to inform the owner or operator of the lighting system that the threshold light levels have been exceeded. The gateway processor circuit could communicate with other micro-processors to trigger a flashing light, send voice or data message to operator, sound an audible alarm, or simply automatically adjust the operation of the system to operate above the threshold.

It should be understood that this exemplary embodiment could be used without SMART LAMP®. It would signal or alarm whenever sensed light level drops below the threshold. The maintenance worker could then check the lights for any possible cause for the lumen drop and, if determined to be only LLD, could increase operating power to a lamp in any of a number of ways. A few non-exhaustive examples were mentioned earlier. You could also manually add capacitance. But an alarm or signal from the circuit of this exemplary embodiment could also cause the maintenance worker to check if any lamp has failed, or to check for out gassing, dirt on lens, or other causes. Some of them could be easily resolved (e.g., dirt cleaned off the lens). Then any increase of operating power to compensate for LLD could be lower than if it were assumed the lumen drop was solely because of LLD.

E. Options and Alternatives

As mentioned previously, the invention can take many forms and embodiments. The foregoing examples are but a few of those. To give some sense of some options and alternatives, a few examples are given below.

The exemplary embodiments are described in the context of sports lighting systems with HID lamps of the type and nominal operating wattage indicated above. The invention can work for other analogous wide area lighting. A few examples are parking lot lighting, roadway and street lighting, and construction site lighting. But further, the broad ideas of the invention can be applied to almost any light source, including individual lamps or light sources with or without fixtures. For example, the methods described herein could be applied to LED (light emitting diode) light sources. LEDs also have a lumen depreciation characteristic. However, the methods could even be applied to light sources that do not have a lumen depreciation characteristic because it can still monitor other sources of lumen depreciation (e.g. LDD). The components necessary to monitor light level away from the source, and report a drop below a threshold, can be economical and non-complex enough to be applied to almost any light source. It could even be applied to light sources that do not exhibit an LLD factor or as severe an LLD factor as HID lamps. For example, it could be used in office lighting using incandescent lighting to detect when dust or dirt has decreased lumen output a certain amount.

The exemplary embodiments have been described in the context of photo sensors as the light level sensors or monitors or photodetectors. A variety of alternatives are possible. Examples include, but are not necessarily limited to semiconductor devices such as photocells, photodiodes, phototransistors, CCDs, and image sensors; or vacuum tube devices like photo-electric tubes, photomultiplier tubes; or mechanical instruments such as the Nichols radiometer.

The way in which a drop below threshold for the light level sensor is reported can also vary. As described, it could vary from just some type of alarm (e.g. activate a light or audible device, e.g. a red LED light is activated at the control box for the lighting system) or communicate it to a remote location (e.g. the office of an entity related to the sports field or to a centralized computer or control). It is possible to have the photo sensor circuit integrated or housed with the photo sensor. Alternatively, the photo sensor circuit could be separate from the photo sensor and have a higher level of programmability. There could be a single junction box for all the photo sensor circuits for a lighting system, or each photo sensor could be connected to single photo sensor circuit that can evaluate each photo sensor output individually.

The number of sensors can vary. In the exemplary embodiment, one per pole was selected as a reasonable number to monitor light output from each pole. As few as one sensor could be used. It could be advantageous that at least two per lighting system or field are used. That way if one malfunctions and does not every indicate a drop of light level below the threshold, at least one other one would likely not also have failed and would monitor at least part of the field. Or if one gives substantially different readings than the other, it may indicate that one is malfunctioning so the system can simply ignore it and rely on the other, or it may indicate that the problem is isolated to a given area and not the entire target area.

The precise threshold level is discretionary. As mentioned, it can be based on data or information from the lamp manufacturer. It could also be based on empirical testing or other criteria. Also, the reference level (e.g. the "100%" described above), could be based on different criteria. For example, it could be set at the time of lamp stabilization instead of at initial operation. Part of the advantage of the invention is that by measuring relative light level externally of the fixture, any and all causes of light loss from the fixture(s) can be addressed, instead of simply focusing on one thing, such as LLD.

The way in which the photo sensor or other light sensor communicates to its photo sensor or analogous circuit can vary; so can the way the photo sensor or analogous circuit communicates its output signal. Some additional examples are: (a) line-of-sight wireless radio, and (b) optical cable. Others are, of course, possible. An advantage of wireless is, of course, that separate hard wiring is not needed.

In the exemplary embodiment one, as light quantity varies (as detected by photo sensor(s)), the output signal changes frequency. This frequency data is communicated back to the gateway circuit via one of the foregoing communication methods. The gateway circuit can then communicate to other circuits to process the signal and generate a message or alarm to report the light condition. Other communication methods and protocols are possible.

1. Customer Reporting

It is to be understood that in this embodiment, by simply sending a notification signal or alarm for personnel to check the lighting system, it allows the option for nothing to be done, or at least, the option not to increase operating wattage to one or more of the lamps, and does not require some automatic action, like automatic increase in operating wattage. As described previously, an inspection may reveal that it is simply dirt on the fixture lens that caused the drop in lumen output. Energy would be saved by simply cleaning the lenses and not increasing wattage. Or, inspection could reveal that it was a false signal or premature failure of one or more lamps. Energy savings would occur by replacing the defective lamps instead of indiscriminately increasing operating power. Conversely, it would allow a decision to increase operating power instead of replacing a burned out lamp.

In addition to monitoring the light levels, historical data can also be recorded on the lighting system performance. Over time, performance information from the monitoring sensors can be used to better predict how lamps and fixtures operate in different environments. This information can then be used to improve the design of lighting fixtures and potentially result in greater energy savings and reduced maintenance cost. Also, periodic reports 128 can be provided to the lighting system owner or operator on the condition of the system. These reports can take many different forms, such as printed reports mailed to each customer, electronic reports distributed via email, or via the Internet web sites. One method for this invention is to report to the customer via the CONTROL-LINK® web site, available from Musco. Each customer has their unique web screen that contains information on their lighted areas, (e.g. sports fields for sports lighting customers, parking lot or ship yard for large area customers, etc.). On this screen, the condition of the lighting system for each area can be communicated to the customer via the actual light level measured or simply a pass/no pass method. It is believed that the latter, simpler approach of stating the light output meets the design criteria or not is the best approach, and most meaningful to the customer. In addition, this screen can also communicate the energy use for each area based on the operating wattage of the lamps. It can also communicate any scheduled maintenance for the lighting system. These types of reports help communicate to the customer that their system is operating in optimal condition and will continue to operate throughout its useful life, which for new technology will likely be in excess of 25 years. Thus, as described above and as can be appreciated by those skilled in the art, the invention includes the ability to report events and keep track of operation and events with respect to one or a plurality of lighting systems, including when they are separated over relatively large distances and remote from a central control. The system can issue periodic reports to the owners/operators of each lighting system. For example, it can regularly post or send a report (e.g. post on a website or send via email) letting the owner/operator/customer of the lighting system know that its lighting system is operating within designed guidelines (e.g. for light output or levels and/or for energy usage) to provide the owner/operator/customer documentation of this information. This provides periodic feedback to the owner/operator/customer on a consistent basis.

2. Customer Service Component

Another option that is practical and feasible with the remote light monitoring and other aspects according to the previously described exemplary embodiments is the ability, if elected, for the lighting system manufacturer or maintainer to offer a business plan to the customer to automatically promise to maintain a certain level of light from the lighting system, or other performance parameters, over an extended period of time. In one form, the customer can choose to purchase (or it can be offered as a part of the price of the lighting system) a maintenance plan where the lighting system manufacturer, its designee or agent, or a maintenance company is responsible to maintain a certain minimum light level from the lighting system over a number of years. The customer has the comfort that, without further cost, that those operating parameters will be automatically maintained. An example of such a business methodology is set forth below.

a) Background Re Customer Service Component

This optional concept which can be used with the light monitoring methodology previously described, in one embodiment, can take the general form of a method and apparatus for maintaining light levels from a lighting system for normal operating life of lights.

The present optional embodiment relates to wide area lighting systems with plural lighting fixtures adapted to collectively light a relatively large area or volume of space, and in particular, to apparatus and methods for allowing an entity to take responsibility to maintain a certain level of light intensity to the area or space.

Many wide area lighting systems, such as for lighting sports fields, arenas, parking lots, construction sites, and race tracks, utilize relatively high wattage HID lamps. All conventional types of these lamps have what is called lamp lumen depreciation ("LLD"). A relatively large amount of lumen output is lost after a first period of operation (e.g. 50-200 hours of operating time). Thereafter, lumen output decreases, but at a slower rate. Over normal operating life of such lamps, lumen output can decrease by 50% or more.

As can be appreciated, many times this amount of light loss is unacceptable. In the case of sports fields and racetracks, a minimum level of light intensity must be maintained for safety reasons. But further, a loss of 50% of original light level would be unacceptable for most lighting applications.

Many times the end user customer is a public entity (e.g. school district, city, park and recreation department, state) or a charitable or non-profit group (e.g. childrens' or non-profit sports league). They are not normally knowledgeable or skilled in lighting, including the issue of LLD. They must either rely on the entities that design the lighting systems, or hire consultants, to advise them.

In the past, the designers or consultants, being aware of LLD and of the fact the lamp manufacturer will not accept responsibility for it, have specified that the new lighting system be designed to produce more than needed light for the application. However, practical constraints limit the amount of over-specification of light. They traditionally design-in excess lamp power and/or number of lighting fixtures to compensate for the approximately 10% LLD that occurs in the first operating period of 50-200 hours. They also may try to compensate for some of the later LLD.

One way they do this is by using what is called the lumen depreciation factor ("LDF") that some manufacturers publish for their lamps. The problems with LDF, the generalized approximation of how much LLD will occur over most of the normal operating life of a lamp, have been discussed earlier. As stated, LDF is no more than a generalized estimate. HID lamps are notorious for behaving differently, even if the same model and manufacture of lamp. LDF is a rough factor and not precise.

Moreover, it looks at only one aspect of lumen depreciation for such lamps and the fixtures with which they are conventionally used. As is well documented and well known in the art, other factors can contribute to lumen depreciation. As also discussed earlier, examples are dirt on the lens of the fixture and out gassing inside the fixture. Therefore, even if some compensation were possible for LLD, other lumen depreciation factors remain. The result is that the amount of light originally provided from the system, and relied upon by the end user, cannot be ensured or maintained in most environments.

Thus, a problem in the art exists with respect to how an end user of a wide area lighting system can have some assurance that the lighting system they purchase, many times for tens of thousands or even hundreds of thousands of dollars, will supply a minimum specified amount of light at the target for the normal useful life of the lighting system, which can be many years.

Lighting system designers have tried to address this problem in the front-end design of such systems. They face two main problems; (a) the minimum light level or foot-candle requirements for the target and (b) maintenance factor (what light level loss can be expected over the course of operation of the lighting system). As described above, the lighting engineer or designer does know something about how the fixture actually works. They know that there will be a relatively predictable LLD. They also know they will have to replace lamps at some point. They further have some knowledge that periodic maintenance must be done on the fixtures (e.g. replacement of parts, cleaning).

However, a state of the art approach has been to design compensation for LLD into the number of light fixtures for the system, and use manual, labor-based approaches to deal with other sources of lumen depreciation or maintenance factor(s); or to substantially ignore some of them.

An alternate method to over designing the lighting system is using a system such as SMART LAMP® technology from Musco. It adds a sub-system to the lighting system to periodically switch-in added capacitance to each lamp circuit, to increase operating power to the lamps. This attempts to compensate for LLD over the normal operating life of the lamps.

An example of maintenance programs to address the labor-based approaches is the 10 CLUB SERVICE® or CONSTANT 25™ type services available from Musco. Musco designs the lighting system as well as takes responsibility for providing a reasonable amount of maintenance of minimum light levels over ten years of operation of the system. The approach is to periodically change the lamps when LLD has reduced light output significantly, or when it is no longer cost effective to continue to operate them. It also includes an amount of manual labor maintenance of the type of cleaning the fixture and lens if needed.

While these approaches provide much more assurance to the end user of the lighting system, they do not address adequately the other maintenance factors, such as discussed above. Therefore, even the 10 CLUB SERVICE® or CONSTANT 25™ present approaches only assume responsibility for the factors that may contribute to light loss, but do not provide an ongoing assurance to the end user that the lighting system is operating as designed and maintaining the minimum light levels.

b) Summary of Customer Service Component

It is therefore a principle object, feature, advantage, or aspect of this optional feature according to the present invention to improve over the state of the art.

It is a further object, feature, advantage, or aspect of the present invention to solve problems and deficiencies in the state of the art.

Further objects, features, advantages, or aspects of the present invention include an apparatus, method, or system which:

a. has an entity other than the end user assume responsibility and liability for maintaining a minimum light level to a target for a long period of time, in one aspect, for about the normal life expectancy of the lighting system;

b. optionally allows some automatic compensation for lumen depreciation of the fixture;

c. optionally allows automatic monitoring of light operation;

d. is economical;

e. is durable, even in out-of-doors environments;

f. provides reasonable accuracy;

g. is practical.

These and other objects, features, advantages, or aspects of the present invention will become more apparent with reference to the accompanying description.

A method according to one aspect of this optional embodiment of the invention comprises (a) monitoring actual light level external of a light fixture to sense magnitude of lumen depreciation not only of the lamp but other factors, (b) increasing operating power to one or more lamps in compensation of lumen depreciation at pre-set times based on prior information about the lamp's LLD, (c) providing, if needed, human maintenance services, and cleaning, repair or replacement of parts.

These and other objects, features, advantages, or aspects of the present invention will become more apparent with reference to the accompanying description.

c) Detailed Description Of Exemplary Embodiments of Customer Service Component

(1) Overview

To assist in a better understanding of this optional aspect according to the invention, one example of a form it could take will now be described in detail. It is to be understood that this is but one form the invention could take. A few alternatives and options will also be described. However, this aspect of the invention could take many forms and embodiments. The scope of the invention is not limited by the few examples given herein. Also, variations and options obvious to those skilled in the art will be included in the scope of the invention.

(2) Specific Example of Customer Service Component

An entity, here a sports lighting system design company, assumes responsibility for maintenance of minimum specified light levels to the target area(s) for a sports lighting system, for an extended period (e.g. twenty-five years) based on the following assumptions:

(a) the lighting system is designed by the company;

(b) the company approves the minimum specified light levels;

(c) the company maintains control of manufacturing and installation of the system;

(d) SMART LAMP® technology is installed with the lighting system;

(e) CONTROL-LINK® technology is installed with the lighting system.

(f) certain limited exclusions apply.

Under step (a), the company uses lamp manufacturer LLD and/or LDF information to assist in selection of characteristics and number of lighting fixtures and the characteristics and type of lamps used with the fixtures.

Under step (b), the company is provided with, and agrees to the light levels.

Under step (c), the company has control over the manufacture, assembly, transport, and installation of the system.

Under step (d) each lamp is operatively connected to the SMART LAMP® technology.

Under step (e) each lighting system has at least one Controller (REC) available from Musco, Oskaloosa, Iowa USA, in which is operatively installed the CONTROL-LINK® technology (see brochure entitled SMART LAMP® from Musco, incorporated by reference herein).

Under step (f), certain exclusions apply. For example, problems from vandalism, theft, or acts of God; or problems from unauthorized or improper use of the system.

The assumption of responsibility is, except for exclusions, to bear all costs and expenses, including labor, to maintain minimum light levels for the extended period of time (e.g. 10 or 25 years) from initial installation.

The reason such assumption is practical is as follows:

(a) SMART LAMP® allows automatic compensation for LLD during the operation of each lamp used in a fixture over the period, including 25 years. There does not need to be periodic measuring of light levels at each field and replacement of lamps prior to the end of normal operating life of such lamps. This saves substantial time and labor.

(b) CONTROL-LINK® allows automatic remote monitoring from a central location of whether there are any problems with any lamp. For example, it can measure electrical characteristics of each lamp for indications that any lamp has failed or may have serious operational problems. It can also automatically turn lights on or off to avoid inadvertent and unnecessary use of the lamps. This, again, saves labor and time, as well as saves energy, labor, time, and lamp operation time.

(c) the company can set up a centralized or regionalized office or offices which can monitor remotely the operation of the lighting systems, and then, when necessary, send live workers to the lighting system site(s) (or have affiliations with independent entities around the country).

Therefore, the efficiencies of these types of systems allow the company to assume such a liability. It makes it practical and economically feasible.

d) LIGHT-STRUCTURE GREEN™ Re Customer Service Component

An optional additional component to the invention could be the use of light fixtures which have one or more of the following characteristics.

First, components of the light fixture can be selected to minimize out gassing during operation. This is explained in more detail in published PCT application PCT/US06/01704, incorporated by reference herein, and is available in the commercially available LIGHT-STRUCTURE GREEN™ (LSG™) product from Musco. Because relatively high temperatures are experienced by at least the interior of these types of light fixtures during operation, some materials or treatments of materials will outgas. The gas phase substances created by the out gassing many times will deposit on, for example, as oxides or other coating, on the reflective surfaces of the fixture, the inside of the glass lens, or on the lamp exterior. This can decrease the reflectivity or disperse the light that strikes it, thereby reducing the amount of light that can be captured and controlled by the fixture so to illuminate the target. It is thus a cause for lumen depreciation for the fixture. An example with the LSG™ product is use of a cast reflector frame that is cooked before it is assembled into the light fixture. This eliminates or reduces out gassing during operation in comparison to conventional spun aluminum reflectors, which many times have substances that outgas. Another example is that the lens gasket, centering ring, and other parts are made of materials or are processing to eliminate or minimize out gassing during operation (for example, various rubbers or similar materials have different levels of out gassing problems and selection can minimize it; also, some parts that otherwise might outgas can be shielded from light and heat to minimize out gassing).

Second, during assembly, contamination or residues on the interior surfaces of the fixture or lamp are minimized or eliminated. For example, clean room type assembly procedures are used (e.g. use of white gloves instead of bare hands to eliminate oils or substances from being deposited on optical surfaces).

Third, the fixture is assembled and sealed at the factory so that during transport or installation, the workers or contractors never take them apart, which could possibly introduce contaminants.

This type of fixture is commercially available from Musco Lighting under the product name LSG™ and LIGHT-STRUCTURE GREEN™ e) Options and Alternatives for Customer Service Component

As mentioned previously, these optional aspects of the invention can take many forms and embodiments. The foregoing examples are but a few of those. To give some sense of some options and alternatives, a few examples are given below.

The concept of assumption of responsibility can take many forms. The one referred to in the exemplary embodiment above is a service, offered for a cost, that the customer or end user would be provided a light level that does not vary more than + or −10% from a reference light level. If light level changes exceed that range, the entity would take steps to bring it back into range of the reference. This could include one or more of increasing operating wattage to the lamps, cleaning of the fixture, replacement of parts, replacement of lamps, or other enumerated steps (with reasonable exceptions). It could take also take the form of a warranty, with or without cost, or even a guarantee. The specifics and exclusions could be set out in a written policy or contract. Essentially an entity, if it had the capabilities, could offer to design, sell, and maintain the system for, e.g., a quarter of a century. This would relieve the end user of substantial burden and assure them of a relatively constant level of light for that long period of time. The lamp manufacturers usually only stand behind a lamp light output level for the first relatively short stabilization period of such lamps, approximately 50 to 200 hours. Some entities offer limited warranties, but based on defects in parts, not on level of light. Some offer maintenance plans, at a cost, that focus on periodic inspection and cleaning of fixtures, but not based on guarantee of light level.

The length of such a policy, and the specifics it covers, could vary. In one exemplary embodiment, it is 25 years. This is commensurate with the reasonable life span of these types of sports lighting systems. This greatly exceeds the normal operating life of a single HID lamp for many, if not most, sports lighting systems. It exceeds the normal life of many such lamps per fixture. But, importantly, the poles, wiring, circuits, cross arms, mounting elbows, reflectors/frames, lenses, etc. are robust to last that long. What can become a cost and burden is the periodic maintenance. And, what has not been done in the past is to take responsibility for the level of light at the target.

One option on this point is as follows. Using CONTROL-LINK® remote monitoring communication and control system, one or more light level sensors could be placed at or near the target of the lighting system (e.g. one on each pole for a field). It could measure a relative light level. It could be calibrated or initialized to a reference value when the lighting system is first turned on. It could then sense if light level drops below a certain threshold. It could generate a signal that could be sent by CONTROL-LINK® to the entity's central office (or regional office). Analysis could be made to see if some remote instruction or diagnostics could be completed to identify or fix the issue, or it could alert or schedule a live maintenance worker to go an personally inspect. U.S. Pat. No. 6,681,110, incorporated by reference, describes more details about this light system monitoring option. The remote monitoring station could keep track of a statistical average of light level readings for all the sensors, or individually. An example of remote diagnostics available through CONTROL-LINK® is periodic automatic checks if a lamp is out or a fuse is blown. In one aspect of the invention, this could be evaluated first if the light sensor indicates a light level drop outside range. This may require a service call to the field, but at least could tell the worker which pole or even which fixtures are involved, saving significant time. The end user could also be sent periodic messages confirming that CONTROL-LINK® indicates that light levels and/or energy consumption and/or other operating parameters or performance parameters are within design specifications or ranges, or could also be sent messages if any events have been sensed that required inspection or remediation.

Also, the number of light level sensors could vary. One could be used. However, at least two are preferred because if one malfunctions and gives false positives, the other would likely operate. It can be even better to have more than two, as different "perspectives" can be monitored. One option is to send the light sensor signals over existing power wires for the poles or lamps. An example is the Echelon product previously described.

CONTROL-LINK® or other wide area communications networks can utilize cell phone networks, satellite communications, landlines, internet, or combinations to communicate. There are other ways.

Another option that could be possible with certain combinations of the invention is as follows. If remote monitoring is available for a relatively large number of lighting systems, data could be collected and stored. It could be then be used for such things as: (a) gaining more precise intelligence about how these systems work, (b) mining the data to gain insight in other ways to better operate, serve, or maintain such systems, (c) gain insight in use patterns for such lighting systems, which could be used for cross-selling or other purposes not directly related to lighting, (d) can potentially identify issues or weak links, so to speak (e.g. a certain type of lamp fails more often than others, a certain environmental setting resulting in more maintenance calls, etc.).

What is claimed is:

1. A method of sensing lumen depreciation from a light source and a lighting fixture comprising:
   a. sensing light quantity produced by the light fixture externally of the lighting fixture at a reference time;

b. sensing light quantity produced by the light fixture externally of the lighting fixture at a different time;

c. comparing the sensed light quantities of steps a. and b. and generating a signal if the comparison indicates an offset greater than a predetermined amount.

2. The method of claim 1 wherein the reference time is based, at least in part, on the operating time of the lighting fixture.

3. The method of claim 1 wherein the reference time is based, at least in part, on the type of light source.

4. The method of claim 3 wherein the reference time is based, at least in part, on LLD characteristics of the light source.

5. The method of claim 1 wherein the signal is used, at least in part, to determine the useful life of the light source.

6. The method of claim 1 wherein the signal is used, at least in part, to compensate for said lumen depreciation.

7. The method of claim 6 wherein the lumen depreciation comprises LLD, LDD, or both LLD and LDD.

8. An apparatus for sensing lumen depreciation from a light source and lighting fixture adapted to illuminate a target area comprising:
   a. a light quantity sensor proximate said target area, said light quantity sensor having a side adapted to selectively measure light from said light source;
   b. a light source control device proximate the lighting fixture;
   c. a remotely located control center;
   d. a wide area network; and
   e. means for bi-directional communication with the light quantity sensor, light source control device, and remotely located control center via the wide area network.

9. The apparatus of claim 8 wherein said light quantity sensor selectivity comprises one or more of:
   a. orientation of said sensor side relative the light source or target area;
   b. field of view of the light measurement; and
   c. wavelength of light measured.

10. The apparatus of claim 8 applied to a plurality of light sources, said apparatus adapted to produce an average light measurement from said light sources.

11. A lighting system according to claim 10 comprising:
    a. a plurality of apparatus; and
    b. a plurality of light source.

12. A method of managing a useful life from a lighting system exhibiting lumen depreciation comprising plural arrays of light fixtures each containing at least one light source intermittently illuminating a large target area to light intensity and uniformity standards over an extended period of cumulative operating time comprising:
    a, operating the lighting system at an initial operating power through an electrical power control circuit distributed to each lighting fixture;
    b. measuring light output with a light output sensor or sensors outside of the fixtures for an array at a first time of operation and the initial operating power, and
    c. communicating and storing in a processor a signal from each light output sensor that is proportional to measured light at the first time of operation;
    d. communicating the stored measurements to a control processor for the lighting system;
    e. measuring light output with the light output sensors at subsequent times of operation of the lighting system and communicating and storing the measurements;
    f. comparing two of the stored measurements in the processor to evaluate lumen depreciation;
    g. if offset between the measurements exceeds a predetermined quantity, generating a signal at a central processor at activate one or more of:
       i. an automatic alarm to an interested party;
       ii. an automatic increase in operating power to the light sources of at least one array; and
    h. repeating steps e, through g. until a predetermined maximum increase in operating power is reached, at which time a signal is generated indicating end of useful life for light sources of the array of light fixture.

13. The method of claim 12 further comprising an additional light output sensor for each array of the system.

14. The method of claim 13 wherein the light output sensors communicate measurements to a single light output sensor processor.

15. The method of claim 12 wherein the measurement at the initial time of operation comprises a calibration measurement and the offset comprises approximately a percentage difference from the calibration measurement.

16. The method of claim 12 wherein the array and an electrical box are mounted on an elevating structure and the light source sensor is mounted on the electrical box.

17. The method of claim 16 wherein the power control circuit is mounted in the electrical box.

18. The method of claim 17 further comprising a communications circuit in the electrical box to communicate to a system processor.

19. The method of claim 18 wherein the system processor communicates data back and firth to a remote processor.

20. The method of claim 19 wherein the remote processor instructs the power control circuit.

\* \* \* \* \*